US011085388B2

(12) United States Patent
Ogawa et al.

(10) Patent No.: US 11,085,388 B2
(45) Date of Patent: Aug. 10, 2021

(54) INJECTOR INJECTION AMOUNT CONTROL DEVICE, INJECTOR INJECTION AMOUNT CONTROL METHOD, AND STORAGE MEDIUM

(71) Applicant: TRANSTRON INC., Yokohama (JP)

(72) Inventors: Masatoshi Ogawa, Yokohama (JP); Hiromitsu Soneda, Yokohama (JP)

(73) Assignee: TRANSTRON INC., Yokohama (JP)

( * ) Notice: Subject to any disclaimer, the term of this patent is extended or adjusted under 35 U.S.C. 154(b) by 0 days.

(21) Appl. No.: 16/824,593

(22) Filed: Mar. 19, 2020

(65) Prior Publication Data

US 2020/0217259 A1 Jul. 9, 2020

Related U.S. Application Data

(63) Continuation of application No. PCT/JP2017/034394, filed on Sep. 22, 2017.

(51) Int. Cl.
*F02D 41/04* (2006.01)
*F02D 41/34* (2006.01)
(Continued)

(52) U.S. Cl.
CPC .............. *F02D 41/04* (2013.01); *F02D 41/34* (2013.01); *F02D 41/40* (2013.01); *F02D 45/00* (2013.01)

(58) Field of Classification Search
CPC .......... F02D 41/04; F02D 41/34; F02D 41/40; F02D 45/00; F02D 41/0085;
(Continued)

(56) References Cited

U.S. PATENT DOCUMENTS 5,119,629 A * 6/1992 Kume ................. F02D 41/1487
60/274
6,244,241 B1 6/2001 Mamiya et al.
(Continued)

FOREIGN PATENT DOCUMENTS

EP 1491746 12/2004
EP 2136056 12/2009
(Continued)

OTHER PUBLICATIONS

Office Action of Japanese Patent Application No. 2019-542935 dated Oct. 6, 2020. Full Machine Translation of the Office Action.
(Continued)

*Primary Examiner* — Joseph J Dallo
(74) *Attorney, Agent, or Firm* — Maschoff Brennan

(57) ABSTRACT

An injector injection amount control device includes: acquiring a measured value of a crank angle that is a rotation angle of a crankshaft of an engine, determining instruction injection amounts of fuel from respective injectors, the respective injectors corresponding to a plurality of cylinders of the engine, estimating a torque arising in each of the plurality of cylinders of the engine based on a non-linear Kalman filter employing an error between the acquired measured value of the crank angle and an estimate value of the crank angle, and correcting the instruction injection amounts for the respective injectors corresponding to the plurality of cylinders such that each of the plurality of estimated torques falls within the same range.

17 Claims, 16 Drawing Sheets

(51) Int. Cl.
*F02D 41/40* (2006.01)
*F02D 45/00* (2006.01)

(58) Field of Classification Search
CPC ....... F02D 2200/0812; F02D 2200/101; F02D 2041/389; F02D 41/182; F02D 41/1497; F02D 41/1401; F02D 2041/1417
See application file for complete search history.

(56) References Cited

U.S. PATENT DOCUMENTS

| | | | |
|---|---|---|---|
| 10,119,490 B1* | 11/2018 | Surnilla | F01N 3/021 |
| 2004/0261400 A1 | 12/2004 | Hiraku et al. | |
| 2006/0042237 A1* | 3/2006 | Nonoyama | F01N 3/0253 |
| | | | 60/297 |
| 2006/0107658 A1* | 5/2006 | Hiranuma | F01N 3/2853 |
| | | | 60/297 |
| 2007/0012031 A1* | 1/2007 | Tanimura | F02D 41/405 |
| | | | 60/285 |
| 2007/0012034 A1* | 1/2007 | Yahata | F01N 11/002 |
| | | | 60/295 |
| 2008/0228374 A1 | 9/2008 | Ishizuka et al. | |
| 2008/0314029 A1* | 12/2008 | Okugawa | F02D 41/029 |
| | | | 60/286 |
| 2009/0107225 A1 | 4/2009 | Ishizuka et al. | |
| 2010/0043403 A1* | 2/2010 | Minamikawa | B01D 46/0061 |
| | | | 60/285 |
| 2010/0089040 A1* | 4/2010 | Handa | F01N 3/0885 |
| | | | 60/287 |
| 2010/0224168 A1* | 9/2010 | Yasuhara | F02D 35/028 |
| | | | 123/406.23 |
| 2011/0100327 A1 | 5/2011 | Nakagawa et al. | |
| 2011/0130944 A1* | 6/2011 | Walder | F02D 41/3809 |
| | | | 701/103 |
| 2014/0048038 A1* | 2/2014 | Yasuda | F02D 35/023 |
| | | | 123/395 |
| 2014/0102413 A1* | 4/2014 | Sasaki | F02P 5/1502 |
| | | | 123/406.19 |
| 2014/0149021 A1* | 5/2014 | Shimasaki | F02P 19/026 |
| | | | 701/111 |
| 2016/0319756 A1 | 11/2016 | Nogaoka | |
| 2017/0058802 A1 | 3/2017 | Eser et al. | |
| 2017/0115172 A1* | 4/2017 | Ogawa | F02D 41/28 |
| 2018/0149103 A1* | 5/2018 | Nishigaki | B60W 10/115 |
| 2018/0216552 A1* | 8/2018 | Yokoi | F01N 3/021 |
| 2018/0283301 A1* | 10/2018 | Higa | F02D 41/22 |
| 2018/0320626 A1* | 11/2018 | Surnilla | F01N 3/36 |
| 2018/0328294 A1* | 11/2018 | Levijoki | F02D 41/1406 |

FOREIGN PATENT DOCUMENTS

| | | |
|---|---|---|
| JP | H10-159637 A | 6/1998 |
| JP | H11-343911 A | 12/1999 |
| JP | 2005-016328 A | 1/2005 |
| JP | 2008-144749 A | 6/2008 |
| JP | 2009-108712 A | 5/2009 |
| JP | 2010-127219 A | 6/2010 |
| JP | 2010-144647 A | 7/2010 |
| JP | 2011-094541 A | 5/2011 |
| JP | 2016-118133 A | 6/2016 |
| JP | 2017-082662 A | 5/2017 |

OTHER PUBLICATIONS

Extended European Search Report of European Patent Application No. 17926001.3 dated Sep. 16, 2020.
Michael Henn et al.: "Estimation of In-Cylinder-Pressure Torque from Angular Speed by Kalman Filtering" In: "Advances in Automotive Control 1995", Jan. 1, 1995 (Jan. 1, 1995), Elsevier, XP055727320, ISBN: 978-0-08-042589-4, pp. 21-26.
Itoh et al. "UKF-based Estimation of Indicated Torque for IC engines Utilizing Nonlinear Two-inertia Model" 51st IEEE Conference on Decision and Control; Dec. 10, 2012.
Written Opinion of PCT/JP2017/034394 dated Dec. 19, 2017.
International Search Report of PCT/JP2017/034394 dated Dec. 19, 2017.

* cited by examiner

US 11,085,388 B2

INJECTOR INJECTION AMOUNT CONTROL DEVICE, INJECTOR INJECTION AMOUNT CONTROL METHOD, AND STORAGE MEDIUM

CROSS-REFERENCE TO RELATED APPLICATION

This application is a continuation application of International Application No. PCT/JP/2017/034394, filed Sep. 22, 2017, the disclosure of which is incorporated herein by reference in its entirety.

FIELD

The embodiments discussed herein are related to an injector injection amount control device, an injector injection amount control method, a program, and a storage medium.

BACKGROUND

Cylinder characteristic variation detection devices that detect variation in cylinder characteristics between cylinders in a multi-cylinder internal combustion engine are known. Such cylinder characteristic variation detection devices use fuel pressure sensors attached to the interiors of fuel injection valves to detect the fuel pressure in an internal fuel path from a fuel inflow port to an injection hole of the fuel injection valves. The variation in cylinder characteristics between cylinders is computed based on variation in fuel pressure between the cylinders as detected by the fuel pressure sensors.

Fuel injection devices that detect specific pressure fluctuation aspects arising due to fuel injection, for example in order to enable injection characteristics to be acquired and corrected, are also known. Such a fuel injection device is a fuel injection device configuring a common rail fuel injection system of an engine, and includes a pressure sensor installed at an injector fuel intake port to measure the fuel pressure at this installation position. This fuel injection device detects various pressure fluctuations relating to injection by an injector injection action based on sensor output from the pressure sensor.

Fuel control devices that control a fuel feed amount for each cylinder of a diesel engine are also known. In such a fuel control device, when a large variation in a specific heat ratio, derived based on the internal pressure of each cylinder, exists between cylinders, target fuel injection amounts are corrected to set a target fuel injection amount for each cylinder so as to give a uniform air excess ratio across the cylinders. Moreover, when the variation in the specific heat ratio between the cylinders is not large, the fuel control device corrects the target fuel injection amounts to set target a fuel injection amount for each cylinder so as to give a uniform indicated mean effective pressure, as derived based on the internal pressure of each cylinder, across each cylinder. This fuel control device employs a crank angle sensor and internal cylinder pressure sensors.

RELATED PATENT DOCUMENTS

Japanese Laid-Open Patent Publication No. 2009-108712
Japanese Laid-Open Patent Publication No. 2008-144749
Japanese Laid-Open Patent Publication No. 2010-127219

SUMMARY

According to an aspect of the embodiments, an injector injection amount control device, comprising: a memory; and a processor coupled to the memory, the processor being configured to perform a process comprising: acquiring a measured value of a crank angle that is a rotation angle of a crankshaft of an engine, determining instruction injection amounts of fuel from respective injectors, the respective injectors corresponding to a plurality of cylinders of the engine, estimating a torque arising in each of the plurality of cylinders of the engine based on a non-linear Kalman filter employing an error between the acquired measured value of the crank angle and an estimate value of the crank angle, and correcting the instruction injection amounts for the respective injectors corresponding to the plurality of cylinders such that each of the plurality of estimated torques falls within the same range.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Detailed explanation follows regarding an example of exemplary embodiments of the technology disclosed herein, with reference to the drawings.

First Exemplary Embodiment

Figure 1:
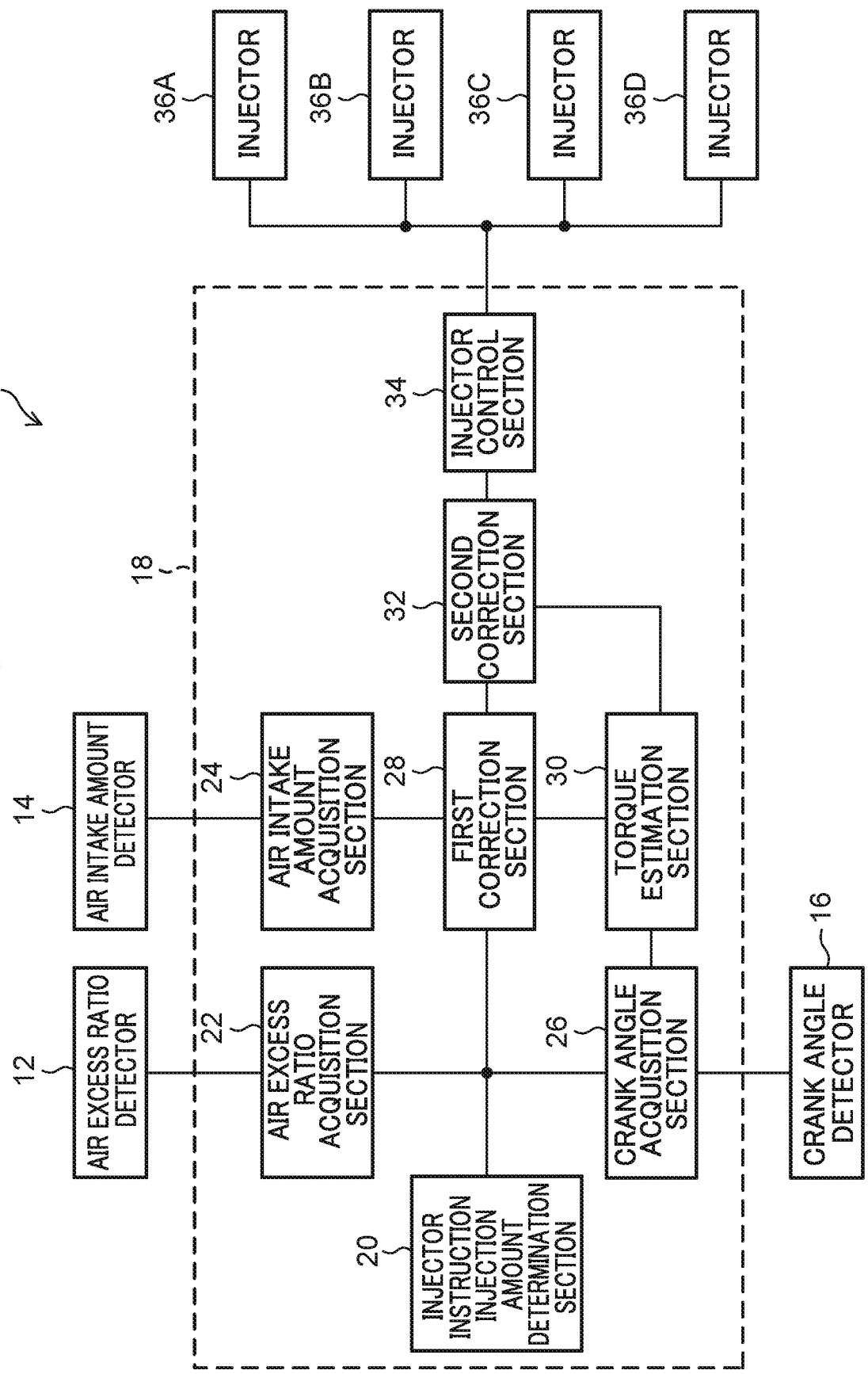
FIG. 1 is a schematic block diagram of an engine control system according to a first exemplary embodiment.

An engine control system 10 illustrated in FIG. 1 controls injection amounts of respective injectors corresponding to plural cylinders of an engine. As illustrated in FIG. 1, the engine control system 10 includes an air excess ratio detector 12, an air intake amount detector 14, a crank angle detector 16, an injector injection amount control device 18, and plural injectors 36A, 36B, 36C, and 36D.

Figure 2:
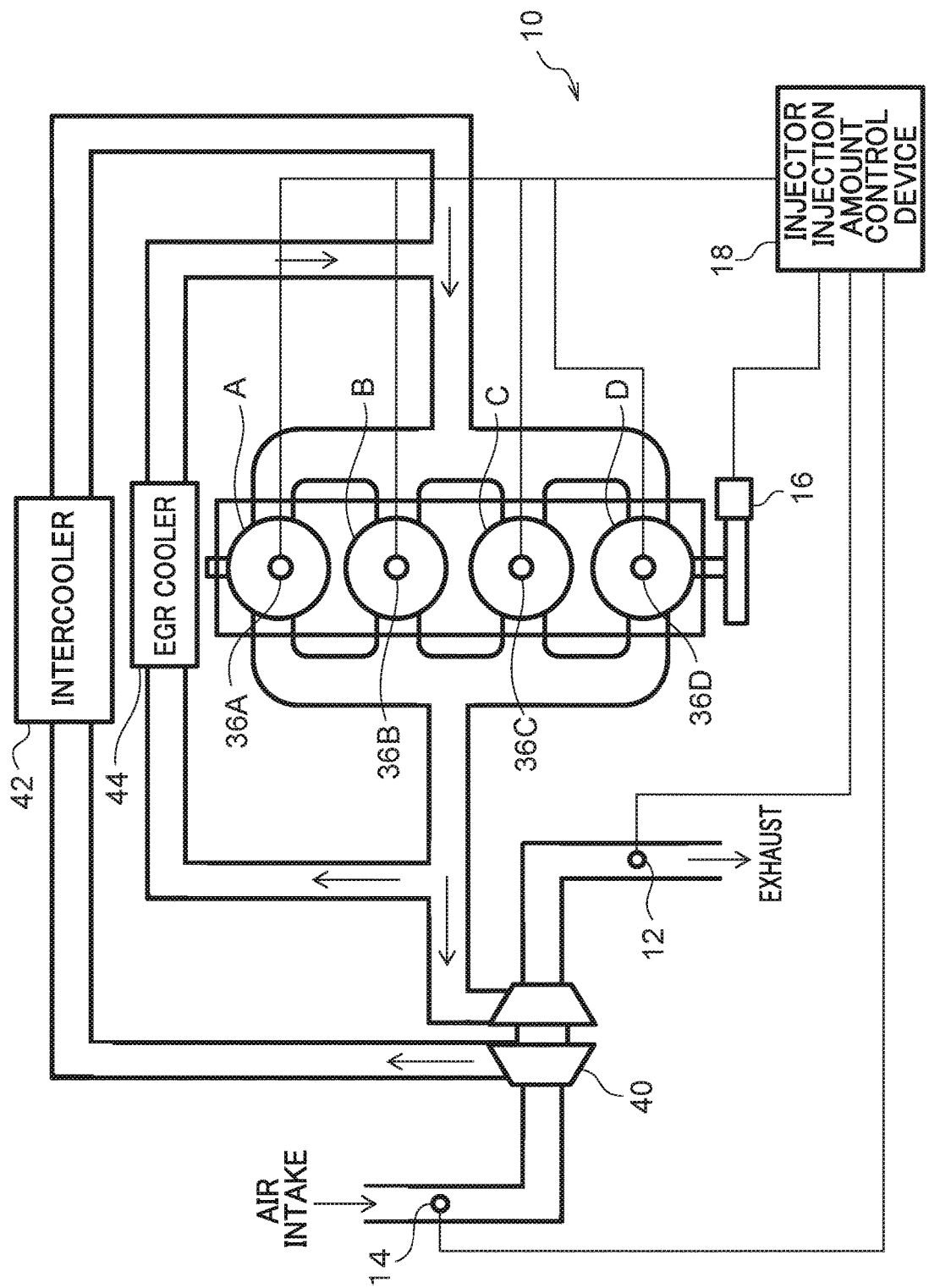
FIG. 2 is a diagram illustrating a specific example of a configuration of an engine control system according to the first exemplary embodiment.

FIG. 2 illustrates a specific example of a configuration of the engine control system 10. As illustrated in FIG. 2, the engine control system 10 controls the injection amounts of the plural injectors 36A, 36B, 36C, and 36D according to sensor information detected by the air excess ratio detector 12, the air intake amount detector 14, and the crank angle detector 16. The engine control system 10 further includes a supercharger 40 to increase the intake air pressure, an intercooler 42 to cool air that has increased in temperature due to compression by the supercharger 40, and an exhaust gas recirculation (EGR) cooler 44 to lower the temperature of high temperature exhaust gas.

The air excess ratio detector 12 successively detects an air excess ratio $\lambda_{sens}$ of gas exhausted from the cylinders of the engine.

The air intake amount detector 14 successively detects an air intake amount mar of air freshly taken into the cylinders of the engine.

The crank angle detector 16 detects a measured value of a crank angle that is a rotation angle of a crankshaft of the engine.

As illustrated in FIG. 1, the injector injection amount control device 18 includes an injector instruction injection amount determination section 20, an air excess ratio acquisition section 22, an air intake amount acquisition section 24, a crank angle acquisition section 26, and a first correction section 28. The injector injection amount control device 18 further includes a torque estimation section 30, a second correction section 32, and an injector control section 34. The crank angle acquisition section 26 is an example of an acquisition section of the technology disclosed herein. The injector instruction injection amount determination section 20 is an example of a determination section of the technology disclosed herein. The torque estimation section 30 is an example of an estimation section of the technology disclosed herein. The first correction section 28 and the second correction section 32 are examples of a correction section of the technology disclosed herein.

The injector instruction injection amount determination section 20 determines a target injection amount $q_{trg}$ as a target amount of fuel to be injected from an injector at respective timings for each of the injectors 36A, 36B, 36C, and 36D corresponding to the plural cylinders of the engine. The injector instruction injection amount determination section 20 also determines an instruction injection amount for the respective injectors as an injection amount to match the target injection amount $q_{trg}$. Specifically, the injector instruction injection amount determination section 20 determines the instruction injection amount to match the target injection amount $q_{trg}$ based on the engine revolution speed, throttle opening, torque demand, or the like.

The air excess ratio acquisition section 22 successively acquires the air excess ratio $\lambda_{sens}$ detected by the air excess ratio detector 12.

The air intake amount acquisition section 24 successively acquires the air intake amount $m_{af}$ detected by the air intake amount detector 14.

The crank angle acquisition section 26 successively acquires the measured value for the crank angle detected by the crank angle detector 16.

The first correction section 28 corrects the instruction injection amount based on the air excess ratio $\lambda_{sens}$ acquired by the air excess ratio acquisition section 22, the air intake amount $q_{sens}$ acquired by the air intake amount acquisition section 24, and the instruction injection amount determined by the injector instruction injection amount determination section 20.

Specifically, first the first correction section 28 uses Equation (1) below to calculate a calculated value $\lambda_{sens}$ of the injector injection amount, according to a predetermined logical air-fuel ratio value $L_{st}$, the air excess ratio $\lambda_{sens}$ acquired by the air excess ratio acquisition section 22, and the air intake amount $m_{af}$ acquired by the air intake amount acquisition section 24.

$$q_{calc} = \frac{m_{af}}{\lambda_{sens} \cdot L_{st}} \qquad (1)$$

Next, the first correction section 28 calculates an engine revolution speed $N_e$ from the measured value of the crank angle acquired by the crank angle acquisition section 26. The first correction section 28 also uses Equation (2) below to calculate an estimate value $g_{inj}$ of the injector injection amount, according to the engine revolution speed $N_e$, a fuel density $\rho_{fuel}$, a number of cylinders $N_{cyl}$, and the calculated value $q_{cale}$ for the injector injection amount.

$$q_{inj} = \frac{q_{calc} \cdot 120 \cdot 1000}{N_e \cdot \rho_{fuel} \cdot N_{cyl}} \qquad (2)$$

Next, the first correction section 28 calculates a first correction coefficient, this being a correction coefficient to be applied to the instruction injection amount, such that the estimate value $g_{inj}$ of the injector injection amount approaches the target injection amount $q_{inj}$ The first correction section 28 then multiplies the instruction injection amount determined by the injector instruction injection amount determination section 20 by the first correction coefficient to correct the instruction injection amount determined by the injector instruction injection amount determination section 20. Note that the specific correction method for the instruction injection amount may for example employ proportional-integral-differential (PID) control, or may employ a method based on a map (table) prepared in advance.

The torque estimation section 30 estimates the torque generated by each of the plural cylinders of the engine based on a non-linear Kalman filter employing an error between the measured value of the crank angle and an estimate value of the crank angle, and an error between a calculated value of a crank angular velocity and an estimate value of the crank angular velocity.

In the present exemplary embodiment, explanation is given regarding an example of a case in which an unscented Kalman filter is employed as the non-linear Kalman filter. Specific explanation follows.

The torque estimation section 30 first calculates the calculated value of the crank angular velocity, this being the rotation angular velocity of the crankshaft, from the measured value for the crank angle acquired by the crank angle acquisition section 26.

Next, the torque estimation section 30 uses Equation (3) below to calculate the error between a measured value $\theta(k)$ of the crank angle acquired by the crank angle acquisition section 26 and an estimate value $\theta^{\wedge-}(k)$ of the crank angle calculated using the non-linear Kalman filter, described later.

$$\Delta\theta(k) = \theta(k) - \theta^{\wedge-}(k) \quad (3)$$

Note that k represents a cycle of an updated count. The torque estimation section 30 also uses Equation (4) below to calculate the error between a calculated value $\theta^{\cdot}(k)$ of the crank angular velocity, and an estimate value $\theta^{\cdot\wedge-}(k)$ of the crank angular velocity calculated using the non-linear Kalman filter, described later.

$$\Delta\dot{\theta}(k) = \dot{\theta}(k) - \hat{\dot{\theta}}^{-}(k) \quad (4)$$

A state estimate value of the present exemplary embodiment includes the crank angle $\theta(k)$, the crank angular velocity $\theta^{\cdot}(k)$, and an indicated torque $\tau(k)$, as illustrated in Equation (5) below.

$$x(k) = \begin{bmatrix} \theta(k) \\ \dot{\theta}(k) \\ \tau(k) \end{bmatrix} \quad (5)$$

When the state vector of Equation (5) is applied in the non-linear Kalman filter of the present exemplary embodiment, Equations (6) and (7) below that employ a non-linear function f and a non-linear function h are used to calculate time series data for the crank angle and time series data for the crank angular velocity.

$$x(k+1) = f(x(k), v(k)) \quad (6)$$

$$\begin{bmatrix} \theta(k) \\ \dot{\theta}(k) \end{bmatrix} = h(x(k), \omega(k)) \quad (7)$$

$$y(k) = \begin{bmatrix} \theta(k) \\ \dot{\theta}(k) \end{bmatrix}$$

Note that $v(k)$ is system noise, and $\omega(k)$ is observation noise. The non-linear function f and the non-linear function h are functions including desired coefficient functions, and in the present exemplary embodiment these are expressed by the non-linear formulae of Equations (7-1) to (7-4) below.

$$\begin{cases} f(x) = A(x)x \\ h(x) = Cx \end{cases} \quad (7\text{-}1)$$

$$A(x) = \begin{bmatrix} 0 & 1 & 0 \\ 0 & z(x) & 1/a_{iner}(\theta) \\ 0 & 0 & 0 \end{bmatrix} \quad (7\text{-}2)$$

$$z(x) = \frac{1}{a_{iner}(\theta)} \left( \frac{a_{gra}(\theta)}{\dot{\theta}} + \alpha_{fri}(\theta) - a_{vel}(\theta)\dot{\theta} \right) \quad (7\text{-}3)$$

$$C = \begin{bmatrix} 1 & 0 & 0 \\ 0 & 1 & 0 \end{bmatrix} \quad (7\text{-}4)$$

The non-linear state formulae illustrated by Equations (7-1) to (7-4) above are input with the measured value $\theta(k)$ for the crank angle at a current timing cycle k, the calculated value $\theta^{\cdot}(k)$ for the crank angular velocity at the current timing cycle k, and the torque value $\tau(k)$ at the current timing cycle k. A crank angle $\theta(k+1)$ for a next timing cycle k+1, a crank angular velocity $\theta^{\cdot}(k+1)$ for the next timing cycle k+1, and a torque $\tau(k+1)$ for the next timing cycle k+1 are then predicted. Note that $a_{iner}(\theta)$ is a term relating to inertia of a piston crank mechanism in the engine, and $a_{gra}(\theta)$ is a term relating to gravity of the piston crank mechanism. $a_{vel}(\theta)$ is a term relating to angular velocity of the piston crank mechanism, and $a_{fri}(\theta)$ is a term relating to friction in the piston crank mechanism. $a_{iner}(\theta)$, $a_{gra}(\theta)$, $a_{vel}(\theta)$, and $a_{fri}(\theta)$ are coefficient functions.

In a four-cycle inline-four cylinder configuration, for example, the No. 1 cylinder and the No. 4 cylinder are in the same phase when at the same piston placement, and the No. 2 cylinder and the No. 3 cylinder are likewise in the same phase when at the same piston placement. Accordingly, in consideration of such a four-cycle inline-four cylinder configuration, a term relating to inertia, a term relating to gravity, a term relating to angular velocity, and a term relating to friction can be expressed as illustrated in Equation (7-5) below by adding together after shifting in phase by 180°.

$$a_{iner}(\theta) = 2(a_{iner\_s}(\theta) + a_{iner\_s}(\theta+\pi))$$

$$a_{gra}(\theta) = 2(a_{gra\_s}(\theta) + a_{gra\_s}(\theta+\pi))$$

$$a_{vel}(\theta) = 2(a_{vel\_s}(\theta) + a_{vel\_s}(\theta+\pi))$$

$$a_{fri}(\theta) = 2(a_{fri\_s}(\theta) + a_{fri\_s}(\theta+\pi)) \quad (7\text{-}5)$$

$a_{iner\_s}(\theta)$ is a coefficient function of the term relating to intertia of a single cylinder $a_{gra\_s}(\theta)$ is a coefficient function of the term relating to gravity to gravity of a single cylinder, $a_{vel\_s}(\theta)$ is a coefficient function of the term relating to the angular velocity of a single cylinder, and $a_{fri\_s}(\theta)$ is a coefficient function of the term relating to friction of a single cylinder.

In the present exemplary embodiment, equation computation portions of the above coefficient functions are calculated by substitution into a table expressing relationships between output values of these coefficient functions and the $\theta$ values. Specifically, a table is established in advance that expresses relationships between the crank angle $\theta$ and the output value of the term $a_{inner}$ $\theta$ relating to inertia, the output value of the term $a_{gra}(\theta)$ relating to gravity, the output value of the term $a_{vel}(\theta)$ relating to angular velocity, and the output value of the term $a_{fri}(\theta)$ relating to friction.

In computation processing of the non-linear Kalman filter of the present exemplary embodiment, the torque estimation section 30 sets an initial value for the state estimate value as in Equation (8) below.

$$\hat{x}^{-}(0) = \begin{bmatrix} \theta(0) \\ \dot{\theta}(0) \\ \tau(0) \end{bmatrix} \quad (8)$$

Next, the torque estimation section 30 sets an initial value P(0) for a post-event error covariance matrix as in Equation (9) below.

$$P(0) = P_0 \quad (9)$$

A variance Q of system noise and a variance R of observation noise are also set. The torque estimation section 30 then executes the following processing at a predetermined cycle. For example, k is repeatedly updated from k=1, 2, 3, . . . until N.

First, the torque estimation section 30 calculates 2n+1 sigma points $\sigma_o$, $\sigma_i$ as sample points respectively corresponding to the mean value and standard deviations from the state estimate value x̂(k−1) and the covariance matrix P (k−1) of the previous cycle.

$$\sigma_0(k-1) = \hat{x}(k-1)(i=1,2,\ldots,n) \quad (10)$$

$$\sigma_i(k-1) = \hat{x}(k-1) + \sqrt{n+\kappa}(\sqrt{P(k-1)})_i (i=1,2,\ldots,n) \quad (11)$$

$$\sigma_{n+i}(k-1) = \hat{x}(k-1) - \sqrt{n+\kappa}(\sqrt{P(k-1)})_i (i=1,2,\ldots,n) \quad (12)$$

Note that $(\sqrt{P})_i$ represents the $i^{th}$ column of a matrix square root of the covariance matrix P. Weightings $w_o$, $w_i$ applied to the respective sigma points are calculated using Equations (13), (14) below.

$$w_0 = \frac{\kappa}{n+\kappa} \quad (13)$$

$$w_i = \frac{1}{2(n+\kappa)} \quad (14)$$

$$(i = 1, 2, \ldots, 2n)$$

Note that $\kappa$ is a scaling parameter. A pre-event state estimate value and a pre-event error covariance matrix calculated using Equations (16) and (17) below are referred to as estimate values for a first order moment and a second order moment. The estimate values for the first order moment and second order moment have a precision up to a Taylor series expansion to second order of f(x(k), v(k)) for a desired non-linear function. Since estimate values to third order moment and above include additional error, $\kappa$ is a parameter to adjust for the effect of such error. Semi-definiteness is guaranteed if $\kappa$ is selected so as to be 0 or above. $\kappa$ is often set to 0 normally.

Next, the torque estimation section 30 uses Equation (15) below to update the sigma point $\sigma_i$ with the non-linear function f.

$$\sigma_i^{-1}(k) = f(\sigma_i(k-1))(i=1,2,\ldots,2n) \quad (15)$$

Next, the torque estimation section 30 uses Equation (16) below to calculate a pre-event state estimate value x̂⁻(k) using a sigma point $\sigma_i^-(k)$ and the weighting $w_i$.

$$\hat{x}^-(k) = \sum_{i=0}^{2n} w_i \sigma_i^-(k) \quad (16)$$

$$(i = 1, 2, \ldots, 2n)$$

Next, the torque estimation section 30 uses Equation (17) below to calculate a pre-event error covariance matrix P⁻(k) from the sigma point $\sigma_i^-(k)$ and the pre-event state estimate value x̂⁻(k). Note that in Equation (17) below, b is a coefficient matrix for system noise.

$$P^-(k) = \sum_{i=0}^{2n} w_i(\sigma_i^-(k) - \hat{x}^-(k))(\sigma_i^-(k) - \hat{x}^-(k))^T + Qbb^T \quad (17)$$

$$(i = 1, 2, \ldots, 2n)$$

Next, the torque estimation section 30 uses Equations (18), (19), and (20) below to recalculate 2n+1 sigma points from the pre-event state estimate value x̂⁻(k) and the pre-event error covariance matrix P⁻(k).

$$\sigma_0^-(k-1) = \hat{x}^-(k-1)(i=1,2,\ldots,n) \quad (18)$$

$$\sigma_i^-(k-1) = \hat{x}^-(k-1) + \sqrt{n+\kappa}(\sqrt{P^-(k-1)})_i (i=1,2,\ldots,n) \quad (19)$$

$$\sigma_{n1i}^-(k-1) = \hat{x}^-(k-1) - \sqrt{n+\kappa}(\sqrt{P^-(i-1)})_i (i=1,2,\ldots,n) \quad (20)$$

Next, the torque estimation section 30 uses Equation (21) below to calculate an output sigma point $\Psi_i^-(k)$ from the sigma point $\sigma_i^-(k)$ and the non-linear function f.

$$\psi_i^-(k) = h(\sigma_i^-(k))(i=1,2,\ldots,2n) \quad (21)$$

Next, the torque estimation section 30 uses Equation (22) below to calculate a pre-event output estimate value ŷ⁻⁰(k) from the output sigma point $\Psi_i^-(k)$.

$$\hat{y}^-(k) = \begin{bmatrix} \hat{\theta}^-(k) \\ \hat{\dot{\theta}}(k) \end{bmatrix} = \sum_{i=0}^{2n} w_i \psi_i^-(k) \quad (22)$$

Next, the torque estimation section 30 uses Equation (23) below to calculate a pre-event output error covariance matrix $P_{yy}^-(k)$ from the output sigma point $\psi_i^-(k)$ and the pre-event output estimate value ŷ⁻(k).

$$P_{yy}^-(k) = \sum_{i=0}^{2n} w_i(\psi_i^-(k) - \hat{y}^-(k))^2 \quad (23)$$

Next, the torque estimation section 30 uses Equation (24) below to calculate a pre-event state/output error covariance matrix $P_{xy}^-(k)$ from the pre-event state estimate value x̂⁻(k) and the pre-event error covariance matrix P⁻(k), the output sigma point $\Psi_i^-(k)$, and the pre-event output estimate value ŷ⁻(k).

$$P_{xy}^-(k) = \sum_{i=0}^{2n} w_i(\sigma_i^-(k) - \hat{x}^-(k))(\psi_i^-(k) - \hat{y}^-(k)) \quad (24)$$

Next, the torque estimation section 30 uses Equation (25) below to calculate a Kalman gain g(k) from the pre-event state/output error covariance matrix $P_{xy}^-(k)$, the pre-event output error covariance matrix $P_{yy}^-(k)$, and the observation noise variance R.

$$g(k) = \frac{P_{xy}^-(k)}{P_{yy}^-(k) + R} \quad (25)$$

Next, the torque estimation section 30 uses Equation (26) below to estimate a state estimate value x̂(k) using the Kalman gain g(k), the error Δθ(k) relating to the crank angle, and the error Δθ˙(k) relating to the crank angular velocity.

$$\hat{x}(k) = \hat{x}^-(k) + g(k)\begin{bmatrix} \Delta \theta (k) \\ \Delta \dot{\theta} (k) \end{bmatrix} \quad (26)$$

Next, the torque estimation section 30 uses Equation (27) below to calculate an post-event error covariance matrix P(k) to be utilized on the next update, using the pre-event error covariance matrix P⁻(k), the pre-event state/output error covariance matrix $P_{xy}^-(k)$, and the Kalman gain g(k).

$$P(k)=P^-(k)-g(k)(P_{xy}^-(k))^T \quad (27)$$

Figure 3:
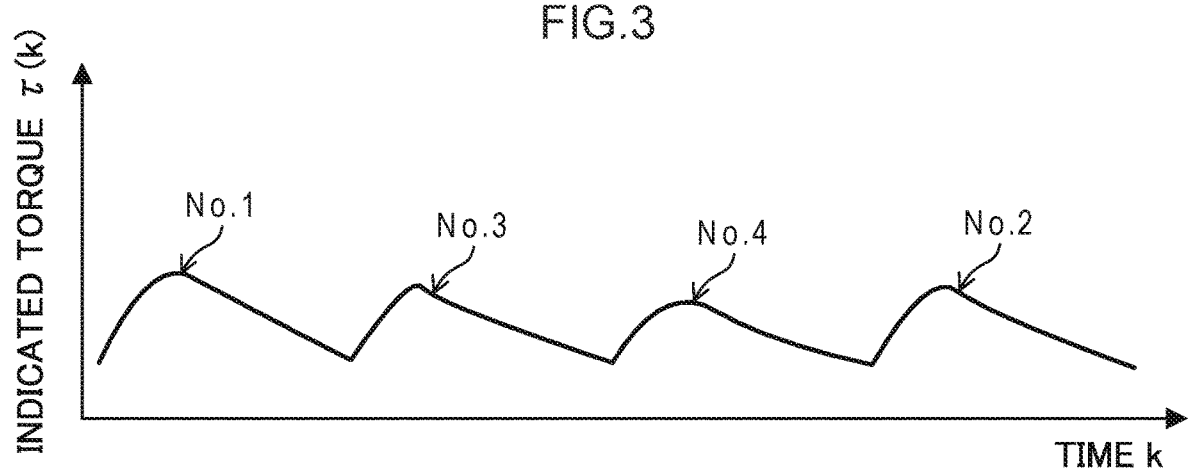
FIG. 3 is an explanatory diagram to explain a relationship between indicated torque and torques of respective cylinders.

The torque estimation section 30 also estimates the torque arising in each cylinder based on the time series data for the indicated torque τ(k) in the state estimate value x^(k). FIG. 3 is an explanatory diagram to explain processing to estimate the torque arising in each cylinder from the indicated torque τ(k).

As illustrated in FIG. 3, the torque estimation section 30 estimates the indicated torque τ(k) for respective timings. In a four-cycle inline-four cylinder configuration, each of the cylinders ignites at a different timing. For example, in a case in which the cylinders are ignited in the sequence No. 1 cylinder, No. 3 cylinder, No. 4 cylinder, No. 2 cylinder as illustrated in FIG. 3, the rises in the indicated torque τ(k) correspond to the torque arising in each cylinder.

A crank rotor includes a missing tooth portion where a tooth is missing in order to detect an absolute angle of the crank angle. The cylinder corresponding to the torque arising at a given timing in the indicated torque τ(k) is identified according to position information of the missing tooth portion of the crank rotor.

Specifically, the torque estimation section 30 identifies ranges of the indicated torque τ(k) corresponding to each of the cylinders based on a relationship between a crank angle range corresponding to the missing tooth portion appearing in the indicated torque τ(k) and the ignition sequence of the cylinders, and associates these ranges with cylinder numbers.

For example, for each of the cylinders, the torque estimation section 30 estimates an average of the indicated torque τ(k) values at each timing within a range identified as corresponding to that cylinder as the torque value for that cylinder. Note that the torque estimation section 30 employs the values of the indicated torque τ(k) in crank angle ranges not including the missing tooth portion of the crank rotor to calculate the average of the indicated torque τ(k) values.

The second correction section 32 corrects the injection amounts of the respective injectors corresponding to the plural cylinders such that the torques arising in the plural cylinders as estimated by the torque estimation section 30 will fall within the same range.

Specifically, the second correction section 32 calculates second correction coefficients for the injection amounts of the respective injectors corresponding to the cylinders such that the respective torque values of the cylinders as estimated by the torque estimation section 30 become uniform. The second correction section 32 then corrects the instruction injection amounts corrected by the first correction section 28 using the second correction coefficients.

As illustrated in FIG. 2, in the present exemplary embodiment, the injector 36A is installed corresponding to a cylinder A, the injector 36B is installed corresponding to a cylinder B, the injector 36C is installed corresponding to a cylinder C, and the injector 36D is installed corresponding to a cylinder D.

The second correction section 32 calculates a proportional torque from the average torque across all cylinders and the torque of a given cylinder based on the torques of each of the cylinders estimated by the torque estimation section 30, and calculates the second correction coefficients for the injection amounts of the respective injectors such that the proportional torque becomes 1.

For example, based on an average torque ti and a torque $\tau_A$ arising in cylinder A as estimated by the torque estimation section 30, the second correction section 32 calculates the second correction coefficient to be applied to the injector 36A such that the proportional torque ($\tau_A/\tau^-$) becomes 1. The second correction coefficient to be applied to the injector 36A may alternatively be calculated such that a proportional torque ($\tau^-/\tau_A$) becomes 1. Note that when the torque of cylinder A is denoted $\tau_A$, the torque of cylinder B is denoted $\tau_B$, the torque of cylinder C is denoted $\tau_C$, and the torque of cylinder D is denoted $\tau_D$, the average torque τ corresponds to $\tau=(\tau_A+\tau_B+\tau_C+\tau_D)/4$. The second correction section 32 similarly calculates the second correction coefficients for the injectors 36B, 36C, and 36D. The injection amount of each of the injectors is thus corrected such that the torques arising in the plural cylinders falls into the same range.

The injector control section 34 controls driving of the injectors 36A to 36D according to the injection amounts of the respective injectors as corrected by the second correction section 32. Specifically, the injector control section 34 controls driving of the injectors 36A to 36D such that the injection amounts of the respective injectors as corrected by the second correction section 32 are injected by the respective injectors.

Figure 4:
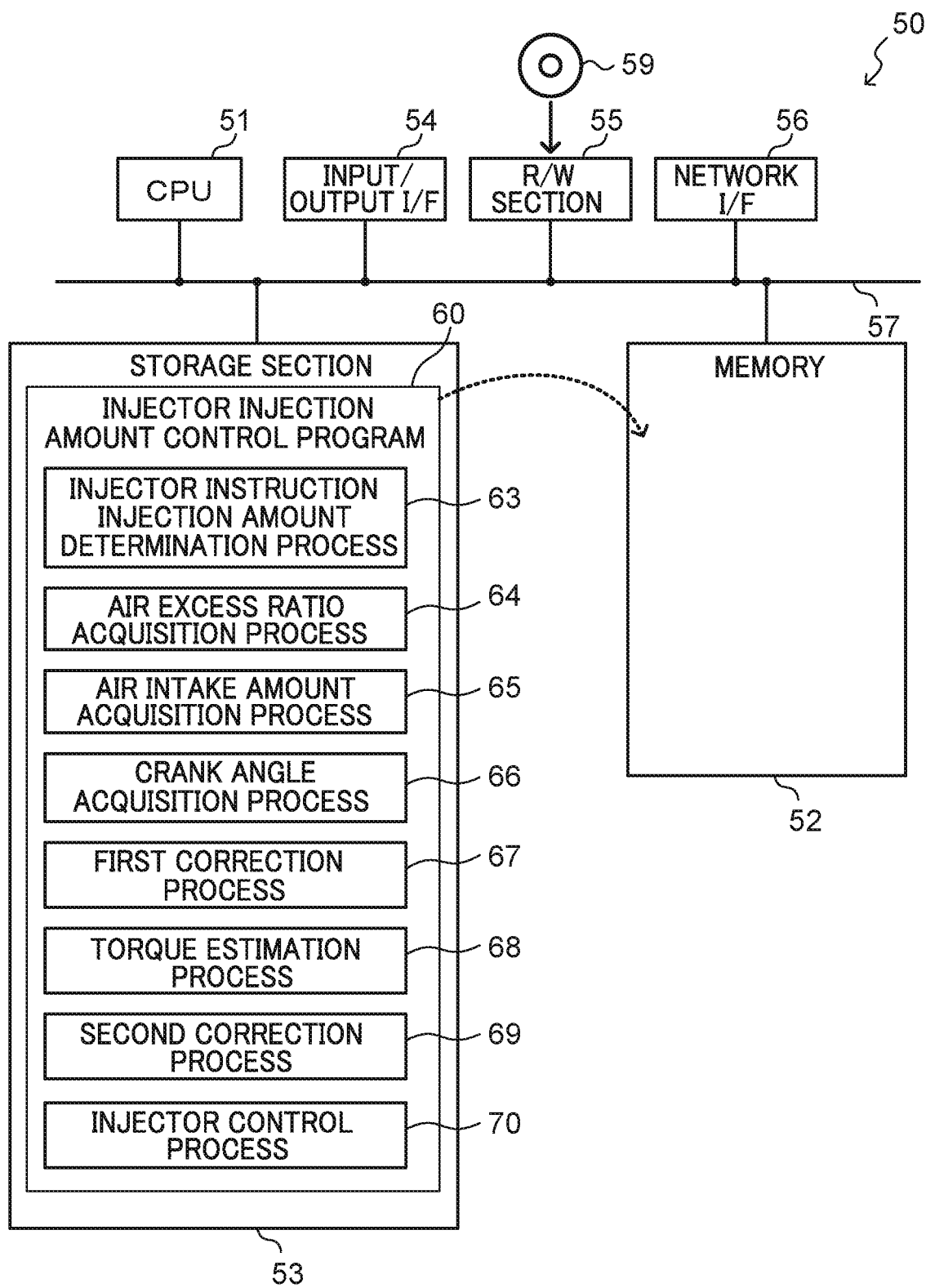
FIG. 4 is a block diagram illustrating a schematic configuration of a computer that functions as an injector injection amount control device according to the first exemplary embodiment.

The injector injection amount control device 18 may, for example, be implemented by a computer 50, illustrated in FIG. 4. The computer 50 includes a CPU 51, memory 52 serving as a temporary storage region, and a non-volatile storage section 53. The computer 50 further includes an input/output interface (I/F) 54 to which input/output devices (not illustrated in the drawings) such as respective sensors, a display device, and an input device are connected, and a read/write (R/W) section 55 that controls reading and writing of data to and from a recording medium 59. The computer 50 further includes a network I/F 56 connected to a network such as the internet. The CPU 51, the memory 52, the storage section 53, the input/output I/F 54, the R/W section 55, and the network I/F 56 are connected together through a bus 57.

The storage section 53 may be implemented by a hard disk drive (HDD), a solid state drive (SSD), flash memory, or the like. The storage section 53, serving as a storage medium, is stored with an injector injection amount control program 60 for causing the computer 50 to function as the injector injection amount control device 18. The injector injection amount control program 60 includes an injector instruction injection amount determination process 63, an air excess ratio acquisition process 64, an air intake amount acquisition process 65, and a crank angle acquisition process 66. The injector injection amount control program 60 further includes a first correction process 67, a torque estimation process 68, a second correction process 69, and an injector control process 70.

The CPU 51 reads the injector injection amount control program 60 from the storage section 53 and expands the injector injection amount control program 60 in the memory 52, and executes the processes of the injector injection amount control program 60 in sequence. The CPU 51 operates as the injector instruction injection amount determination section 20 illustrated in FIG. 1 by executing the injector instruction injection amount determination process 63. The CPU 51 operates as the air excess ratio acquisition section 22 illustrated in FIG. 1 by executing the air excess ratio acquisition process 64. The CPU 51 operates as the air intake amount acquisition section 24 illustrated in FIG. 1 by executing the air intake amount acquisition process 65. The CPU 51 operates as the crank angle acquisition section 26 illustrated in FIG. 1 by executing the crank angle acquisition process 66. The CPU 51 operates as the first correction section 28 illustrated in FIG. 1 by executing the first correction process 67. The CPU 51 operates as the torque estimation section 30 illustrated in FIG. 1 by executing the torque estimation process 68. The CPU 51 operates as the second correction section 32 illustrated in FIG. 1 by executing the second correction process 69. The CPU 51 operates as the injector control section 34 illustrated in FIG. 1 by executing the injector control process 70. The computer 50 executing the injector injection amount control program 60 thus functions as the injector injection amount control device 18. The CPU 51 corresponds to hardware that executes the injector injection amount control program 60 corresponding to software.

Note that the functionality implemented by the injector injection amount control program 60 may, for example, be implemented by a semiconductor integrated circuit, more specifically by an application specific integrated circuit (ASIC) or the like.

Figure 5:
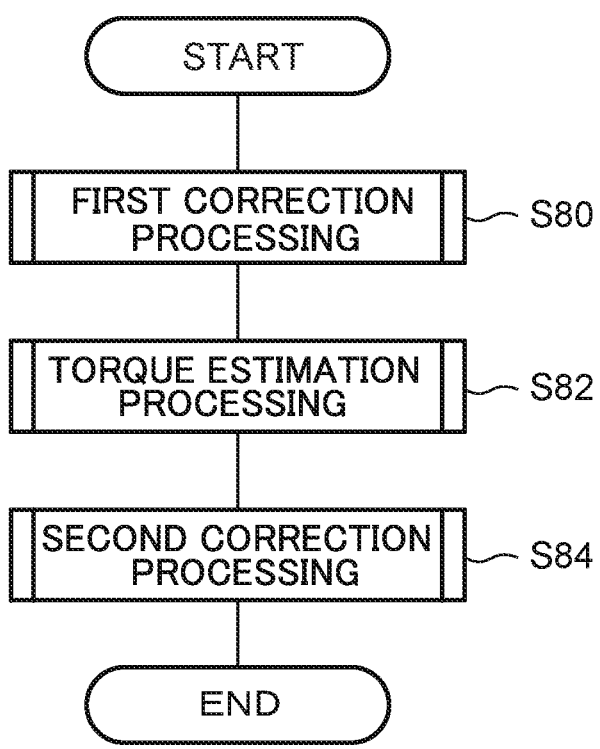
FIG. 5 is a flowchart illustrating an example of injector injection amount control program of an exemplary embodiment.

Next, explanation follows regarding operation of the injector injection amount control device 18 according to the present exemplary embodiment. In the engine control system 10, the air excess ratio detector 12 successively detects the air excess ratio in the engine, the air intake amount detector 14 successively detects the air intake amount of the engine, and the crank angle detector 16 successively detects the measured value of the crank angle. The injector injection amount control device 18 executes the injection amount control processing illustrated in FIG. 5.

Figure 6:
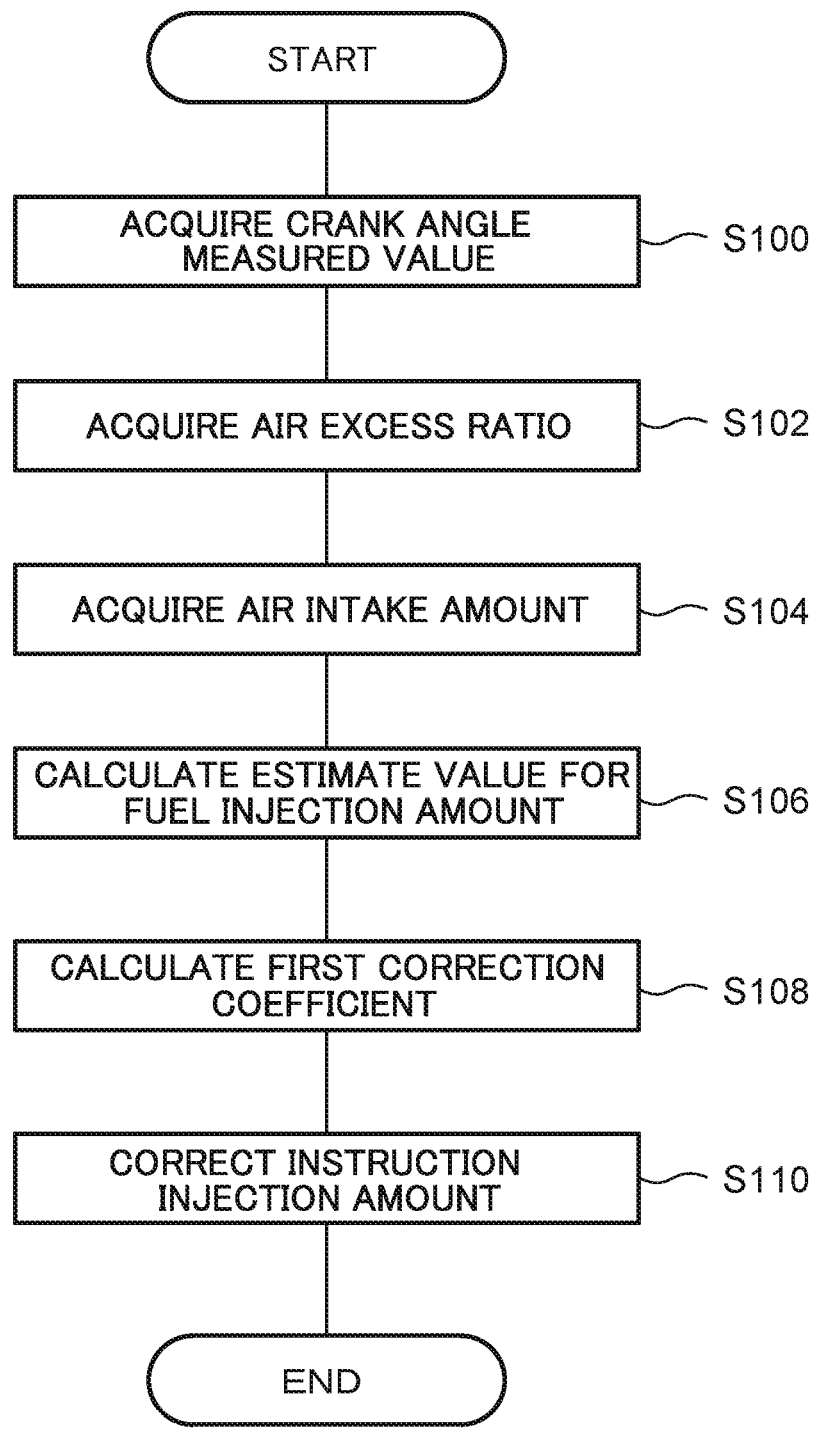
FIG. 6 is a flowchart illustrating an example of first correction processing of an exemplary embodiment.

At step S80, the first correction section 28 calculates the first correction coefficient configuring a correction coefficient to be applied to the corresponding instruction injection amount such that the estimate value $q_{inj}$ of the injector injection amount approaches the target injection amount $q_{trg}$. The first correction section 28 then multiplies the instruction injection amount determined by the injector instruction injection amount determination section 20 by the first correction coefficient so as to correct the instruction injection amount determined by the injector instruction injection amount determination section 20. Step S80 is implemented by the first correction processing illustrated in FIG. 6.

Figure 7:
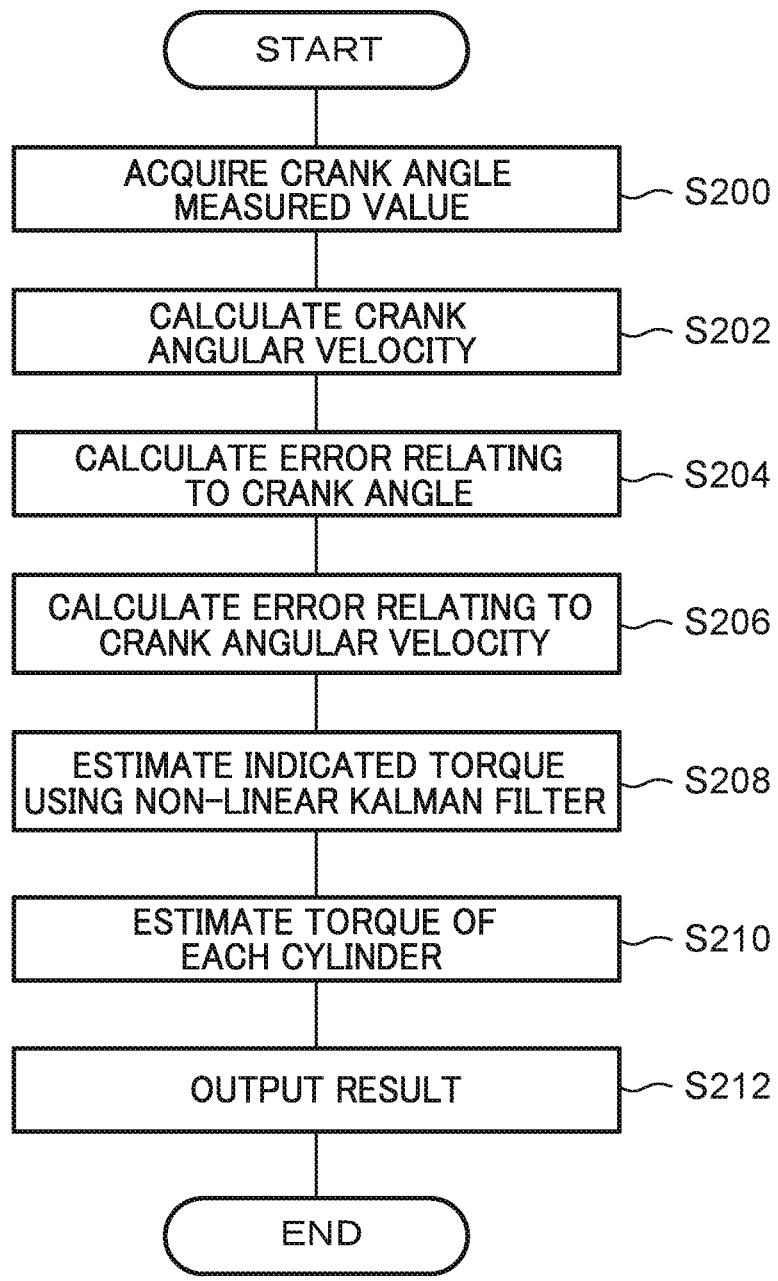
FIG. 7 is a flowchart illustrating an example of torque estimation processing of an exemplary embodiment.

At step S82, the torque estimation section 30 estimates the torque of each cylinder based on the non-linear Kalman filter employing the error between the measured value of the crank angle and the estimate value of the crank angle and the error between the calculated value of the crank angular velocity and the estimate value of the crank angular velocity. Step S82 is implemented by the torque estimation processing illustrated in FIG. 7.

Figure 8:
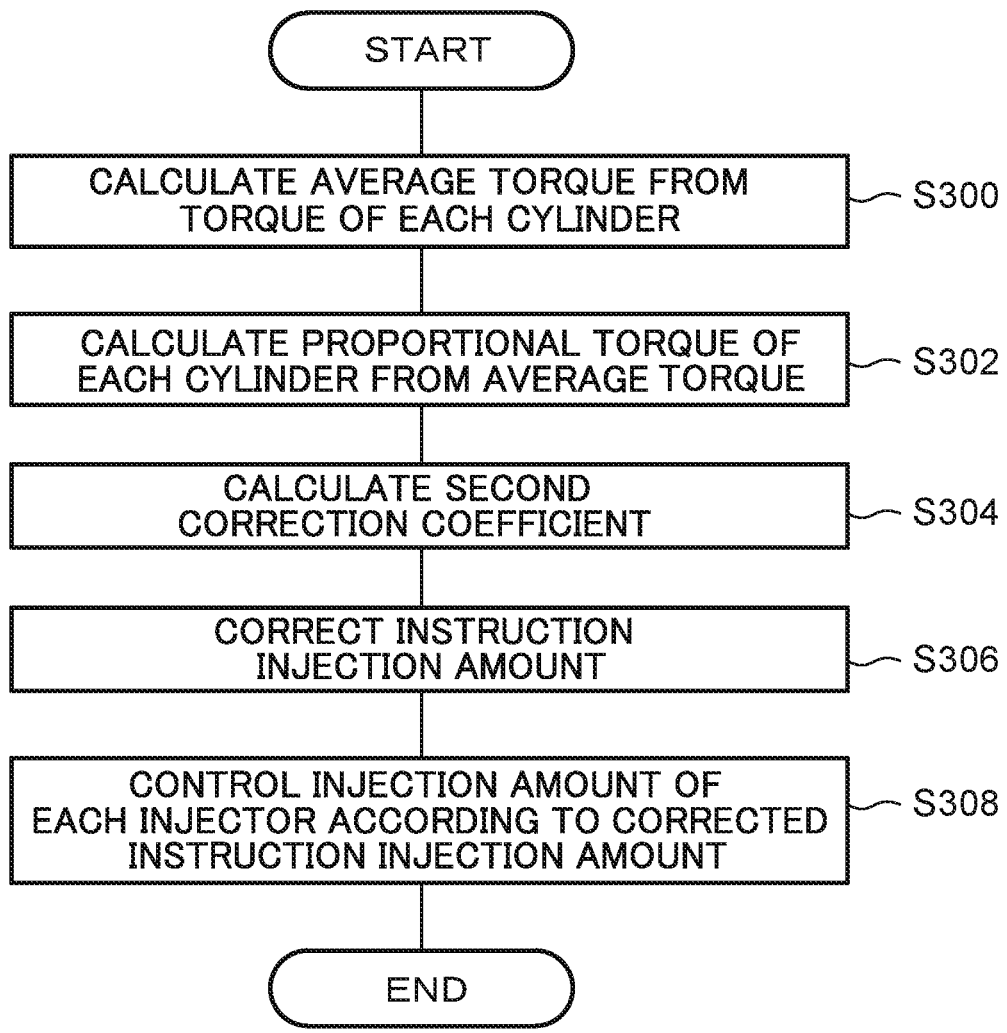
FIG. 8 is a flowchart illustrating an example of second correction processing of an exemplary embodiment.

At step S84, the second correction section 32 further corrects the instruction injection amounts of the respective injectors corresponding to the plural cylinders such that the respective torques arising in the plural cylinders as estimated at step S82 become uniform. Step S84 is implemented by the second correction processing illustrated in FIG. 8.

First Correction Processing

At step S100, the crank angle acquisition section 26 acquires the measured value $\theta(k)$ for the crank angle detected by the crank angle detector 16.

At step S102, the air excess ratio acquisition section 22 acquires the air excess ratio $\lambda_{sens}$ detected by the air excess ratio detector 12.

At step S104, the air intake amount acquisition section 24 acquires the air intake amount $m_{af}$ detected by the air intake amount detector 14.

At step S106, the first correction section 28 uses Equation (1) to calculate the calculated value $q_{calc}$ of the corresponding injector injection amount according to the predetermined logical air-fuel ratio value $L_{st}$, the air excess ratio $\lambda_{sens}$ acquired at step S102, and the air intake amount $m_{af}$ acquired at step S104. Next, the first correction section 28 calculates the engine revolution speed $N_e$ from the measured value of the crank angle acquired at step S100. The first correction section 28 then uses Equation (2) to calculate the estimate value $q_{inj}$ of the injector injection amount based on the engine revolution speed $N_e$, the fuel density $\rho_{fuel}$, the number of cylinders $N_{cyl}$, and the calculated fuel amount value $q_{calc}$.

At step S108, the first correction section 28 calculates the first correction coefficient, this being a correction coefficient to be applied to the instruction injection amount, such that the estimate value $q_{inj}$ for the injector injection amount approaches the target injection amount $q_{trg}$.

At step S110, the first correction section 28 multiplies the instruction injection amount determined by the injector instruction injection amount determination section 20 by the first correction coefficient to correct the instruction injection amount. This completes the first correction processing.

Torque Estimation Processing

At step S200, the torque estimation section 30 acquires the measured value of the crank angle acquired at step S100 of the first correction processing.

At step S202, the torque estimation section 30 calculates a calculated value of the crank angular velocity from the measured value $\theta(k)$ of the crank angle acquired at step S200.

At step S204, the torque estimation section 30 uses Equation (3) to calculate the error $\Delta\theta(k)$ between the measured value $\theta(k)$ of the crank angle acquired at step S200 and the estimate value $\theta^{\hat{}-}(k)$ of the crank angle calculated at a previous step using the non-linear Kalman filter.

At step S206, the torque estimation section 30 uses Equation (4) to calculate the error $\Delta\theta^{\cdot}(k)$ between the calculated value $\theta^{\cdot}(k)$ of the crank angular velocity obtained at step S202 and the estimate value $\theta^{\cdot\hat{}-}(k)$ of the crank angular velocity calculated at a previous step using the non-linear Kalman filter.

At step S208, the torque estimation section 30 uses Equation (26) to estimate the state estimate value $x^{\hat{}}(k)$ employing the error $\Delta\theta(k)$ relating to the crank angle obtained at step S204, and the error $\Delta\theta^{\cdot}(k)$ relating to the crank angular velocity obtained at step S206.

At step S210, the torque estimation section 30 estimates the torque arising in each cylinder based on the indicated torque $\tau(k)$ in the state estimate value $x^{\hat{}}(k)$. Specifically, the torque estimation section 30 estimates the mean value of the indicated torque $\tau(k)$ at each timing within the identified range for each of the cylinders based on the indicated torque $\tau(k)$ as the torque value for each of the cylinders.

At step S212, the torque estimation section 30 outputs the torque of each of the cylinders as estimated at step S210 as a result, thus completing the torque estimation processing.

Second Correction Processing

At step S300, the second correction section 32 calculates the average torque based on the torque of each of the cylinders output in a predetermined time segment at step S212 of the torque estimation processing.

At step S302, the second correction section 32 calculates the proportional torque of each of the cylinders from the average torque calculated at step S300 and the torques of the respective cylinders.

At step S304, the second correction section 32 calculates the second correction coefficient to be applied to the instruction injection amount of the injector of each of the cylinders such that the proportional torque calculated at step S302 becomes 1. The second correction coefficients are calculated for each of the injectors.

At step S306, the second correction section 32 further corrects the instruction injection amounts corrected in the first correction processing described above by multiplying the instruction injection amounts by the second correction coefficients calculated at step S304 to be applied to the respective injectors corresponding to the cylinders.

At step S308, the second correction section 32 outputs the instruction injection amounts for the respective injectors corrected at step S306 as results. The injector control section 34 then controls driving of the respective injectors 36A to 36D such that the injection amounts of the respective injectors as corrected by the second correction section 32 are injected by the respective injectors.

As described above, the injector injection amount control device according to the present exemplary embodiment estimates the torques arising in the plural cylinders of an engine based on a non-linear Kalman filter employing the error between the measured value of the crank angle and the estimate value of the crank angle. The injector injection amount control device then corrects the injection amounts of the respective injectors corresponding to the plural cylinders such that the plural torques fall within the same range. This enables variation in the fuel injection amounts of the respective cylinders of the engine to be suppressed without the installation of additional predetermined sensors in the engine system.

Existing onboard sensors in a vehicle can be employed to suppress variation in the injection amounts of the respective cylinders that arises as a result of degradation over time. Moreover, suppressing variation in the injection amounts of the injectors enables a downturn in exhaust gas performance and fuel efficiency performance of the engine according to degradation of the injectors over time to be reduced.

Evaluation Testing

Using a four cylinder engine, a situation was simulated in which the injection amount of one injector had increased by a predetermined amount over a target injection amount due to degradation over time. Evaluation was performed as to whether or not the error between the target injection amount and the actual injection amount arising due to this increase (variation in the injection amount) could be suppressed using the injector injection amount control device according to the present exemplary embodiment.

Figure 9:
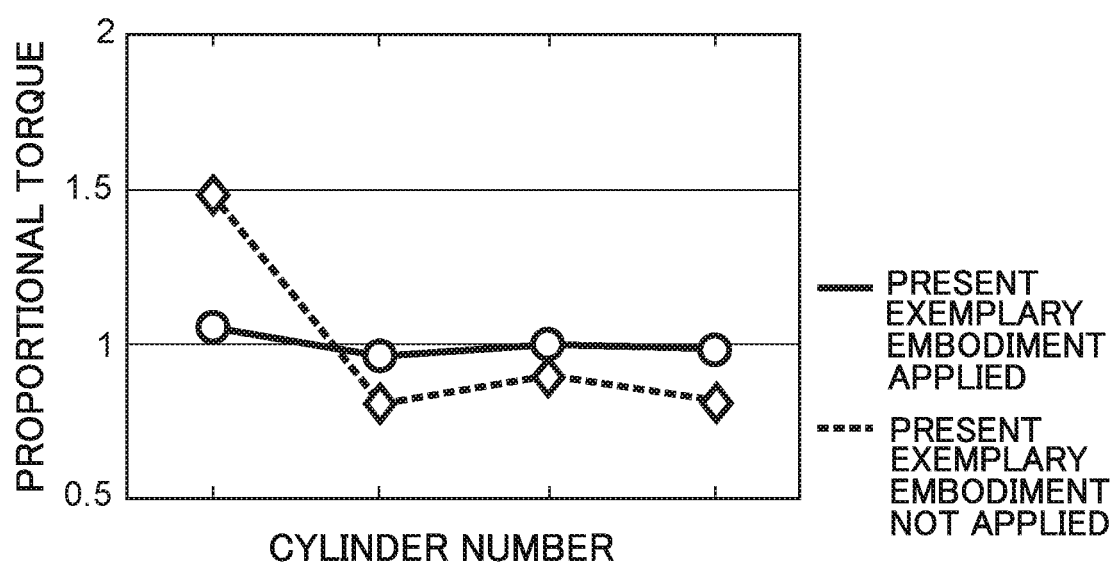
FIG. 9 is an explanatory diagram to explain results of evaluation testing.

FIG. 9 illustrates comparison results for a simulated case of an increased injection amount in the No. 1 cylinder under predetermined conditions, between the proportional torque of each cylinder in a case in which the present exemplary embodiment has been applied (the solid line in FIG. 9), and the proportional torque of each cylinder in a case in which the present exemplary embodiment has not been applied (the dashed line in FIG. 9). The vertical axis represents the proportional torque, and the horizontal axis represents the cylinder numbers. It can be seen that applying the present exemplary embodiment enables variation in torque between the cylinders to be suppressed.

Figure 10:
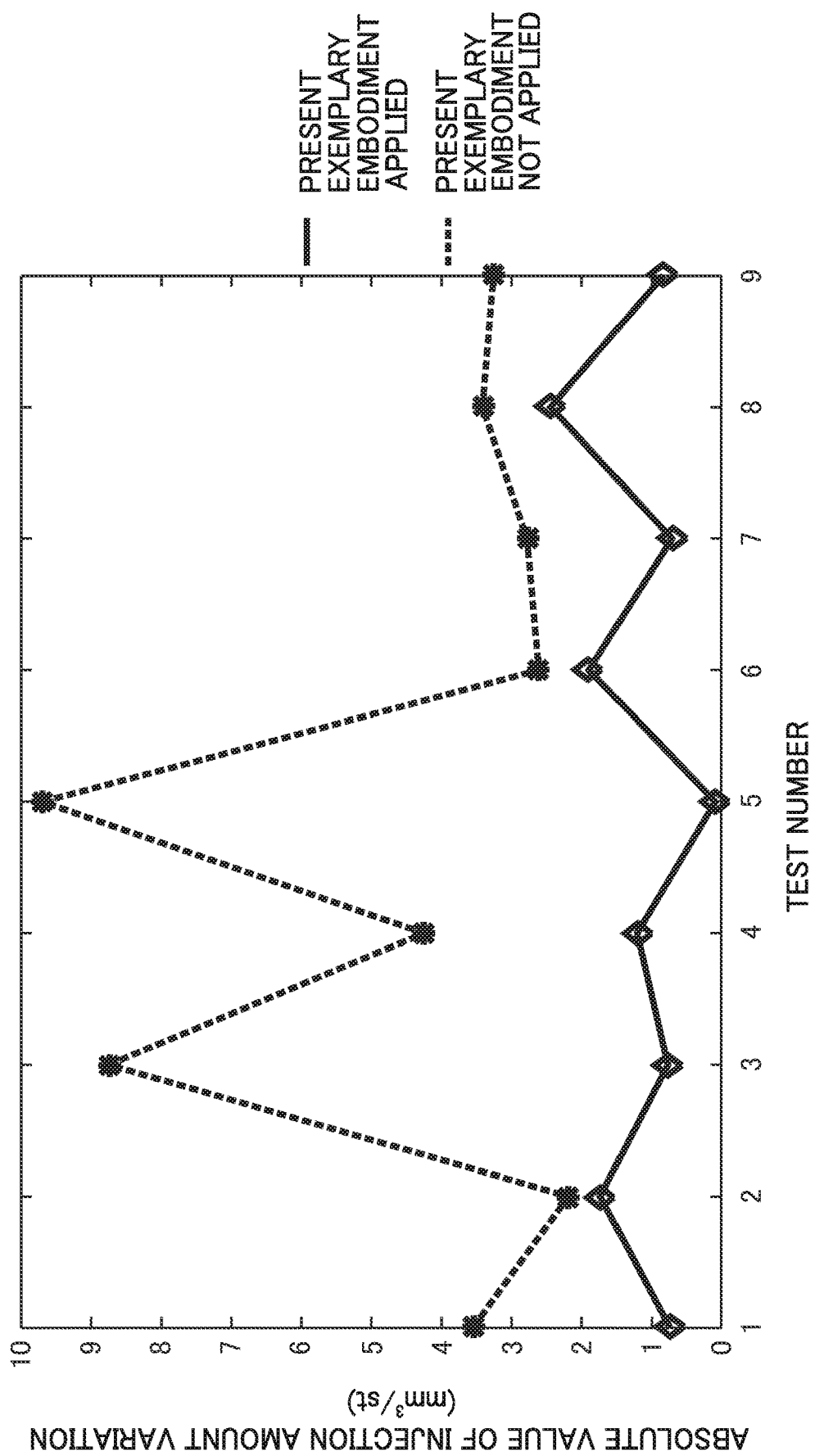
FIG. 10 is an explanatory diagram to explain results of evaluation testing.

FIG. 10 illustrates comparison results for variation in injection amounts under nine different test conditions in a case in which the present exemplary embodiment has been applied (the solid line in FIG. 10) and a case in which the present exemplary embodiment has not been applied (the dashed line in FIG. 10). The vertical axis represents absolute values of the variation in the injection amounts, and the horizontal axis represents the test conditions. The mean value of the absolute values of the variation in the injection amounts for the nine conditions was 4.49 ($mm^3$/st) without the present exemplary embodiment being applied, and was 1.16 ($mm^3$/st) with the present exemplary embodiment being applied. It was thus confirmed that the present exemplary embodiment is capable of greatly suppressing variation in the injection amounts.

Thus, the present exemplary embodiment is capable of suppressing variation in the fuel injection amounts of the injectors, and is also capable of reducing a downturn in the exhaust gas performance and fuel efficiency performance of an engine due to degradation of the injectors over time.

Second Exemplary Embodiment

Explanation follows regarding a second exemplary embodiment. An engine control system of the second exemplary embodiment differs from that of the first exemplary embodiment in the point of being applied with a diesel particulate filter (DPF) combustion-based regeneration control system that regenerates by combusting particulate matter (PM) that has accumulated on the DPF. Note that sections having similar configurations to those in the first exemplary embodiment are allocated the same reference numerals, and explanation thereof is omitted.

Figure 11:
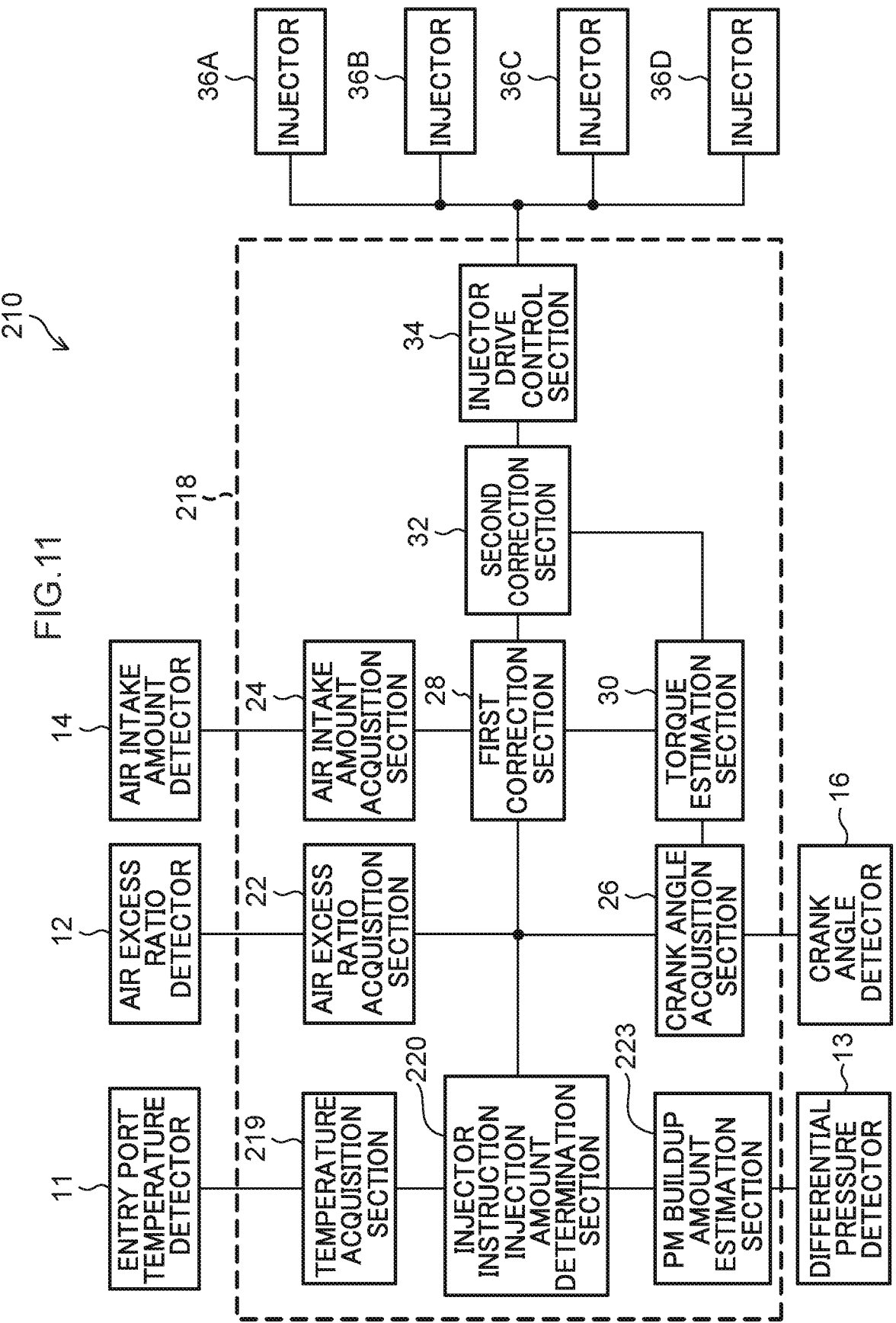
FIG. 11 is a schematic block diagram illustrating a DPF combustion-based regeneration control system according to a second exemplary embodiment.

A DPF combustion-based regeneration control system 210 illustrated in FIG. 11 includes an entry port temperature detector 11, an air excess ratio detector 12, a differential pressure detector 13, an air intake amount detector 14, a crank angle detector 16, and an injector injection amount control device 218. The DPF combustion-based regeneration control system 210 further includes plural injectors 36A, 36B, 36C, and 36D.

Figure 12:
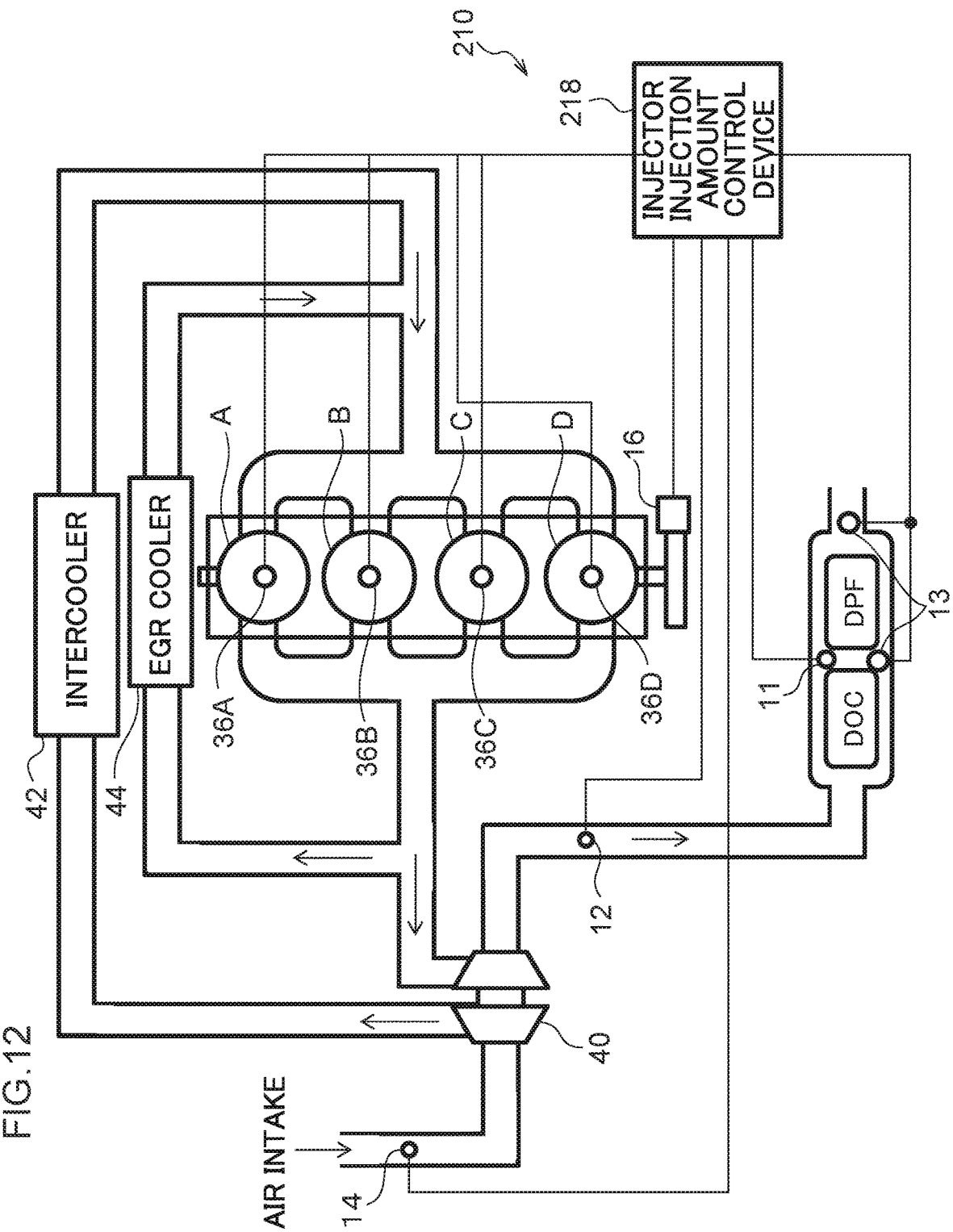
FIG. 12 is a diagram illustrating a specific configuration example of a DPF combustion-based regeneration control system according to the second exemplary embodiment.
Figure 13:
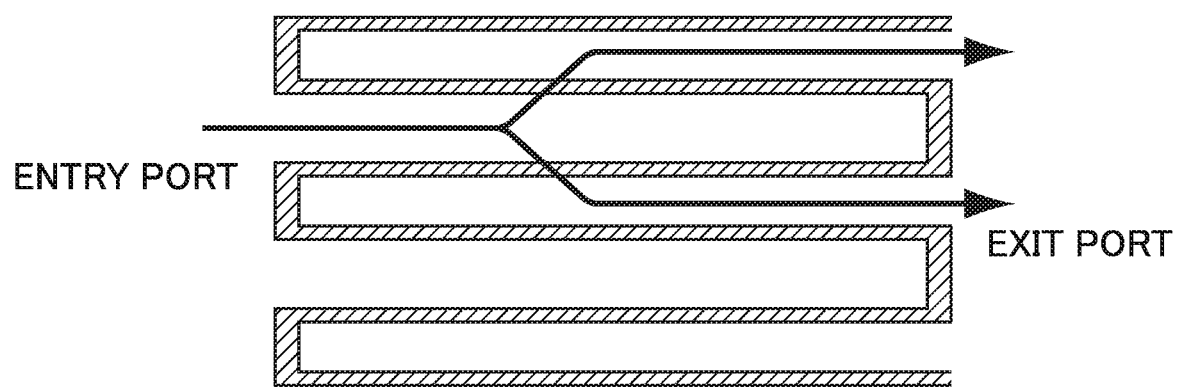
FIG. 13 is an explanatory diagram to explain a DPF.

FIG. 12 illustrates a specific example of a configuration of the DPF combustion-based regeneration control system 210. As illustrated in FIG. 12, the DPF combustion-based regeneration control system 210 controls the injection amounts of the plural injectors 36A, 36B, 36C, and 36D according to sensor information detected by the entry port temperature detector 11, the air excess ratio detector 12, the differential pressure detector 13, the air intake amount detector 14, and the crank angle detector 16. As illustrated in FIG. 12, exhaust gas from the engine passes through a diesel oxidation catalyst (DOC) and reaches a diesel particulate filter DPF. FIG. 13 is an explanatory diagram to explain the structure of the diesel particulate filter DPF. As illustrated in FIG. 13, exhaust gas enters the diesel particulate filter DPF through an entry port and particulate matter PM contained in the exhaust gas is filtered out.

The entry port temperature detector 11 detects the temperature at the entry port of the diesel particulate filter DPF.

The differential pressure detector 13 detects differential pressure representing the difference in pressure between the entry port of the diesel particulate filter DPF and an exit port of the diesel particulate filter DPF.

As illustrated in FIG. 11, the injector injection amount control device 218 includes an injector instruction injection amount determination section 220, an air excess ratio acquisition section 22, an air intake amount acquisition section 24, a crank angle acquisition section 26, a temperature acquisition section 219, and a PM buildup amount estimation section 223. The injector injection amount control device 218 further includes a first correction section 28, a torque estimation section 30, a second correction section 32, and an injector control section 34. The PM buildup amount estimation section 223 is an example of a buildup amount estimation section of the technology disclosed herein.

The temperature acquisition section 219 acquires the temperature at the entry port of the diesel particulate filter DPF detected by the entry port temperature detector 11.

The PM buildup amount estimation section 223 acquires the differential pressure detected by the differential pressure detector 13. The PM buildup amount estimation section 223 then estimates the amount of particulate matter PM buildup that has accumulated on the diesel particulate filter DPF according to the differential pressure.

The injector instruction injection amount determination section 220 determines the injector instruction injection amounts based on the particulate matter PM buildup amount estimated by the PM buildup amount estimation section 223 and the temperature at the entry port of the diesel particulate filter DPF acquired by the temperature acquisition section 219.

Specifically, the injector instruction injection amount determination section 220 calculates injector instruction injection amounts so as to control such that the temperature value at the entry port of the diesel particulate filter DPF reaches a predetermined temperature until the particulate matter PM buildup amount reaches a predetermined value or lower. Note that the control method employed therefor may be PID control, control based on a map (table) prepared in advance, or the like.

The first correction section 28 and the second correction section 32 of the second exemplary embodiment determines the injector instruction injection amounts similarly to in the first exemplary embodiment.

Figure 14:
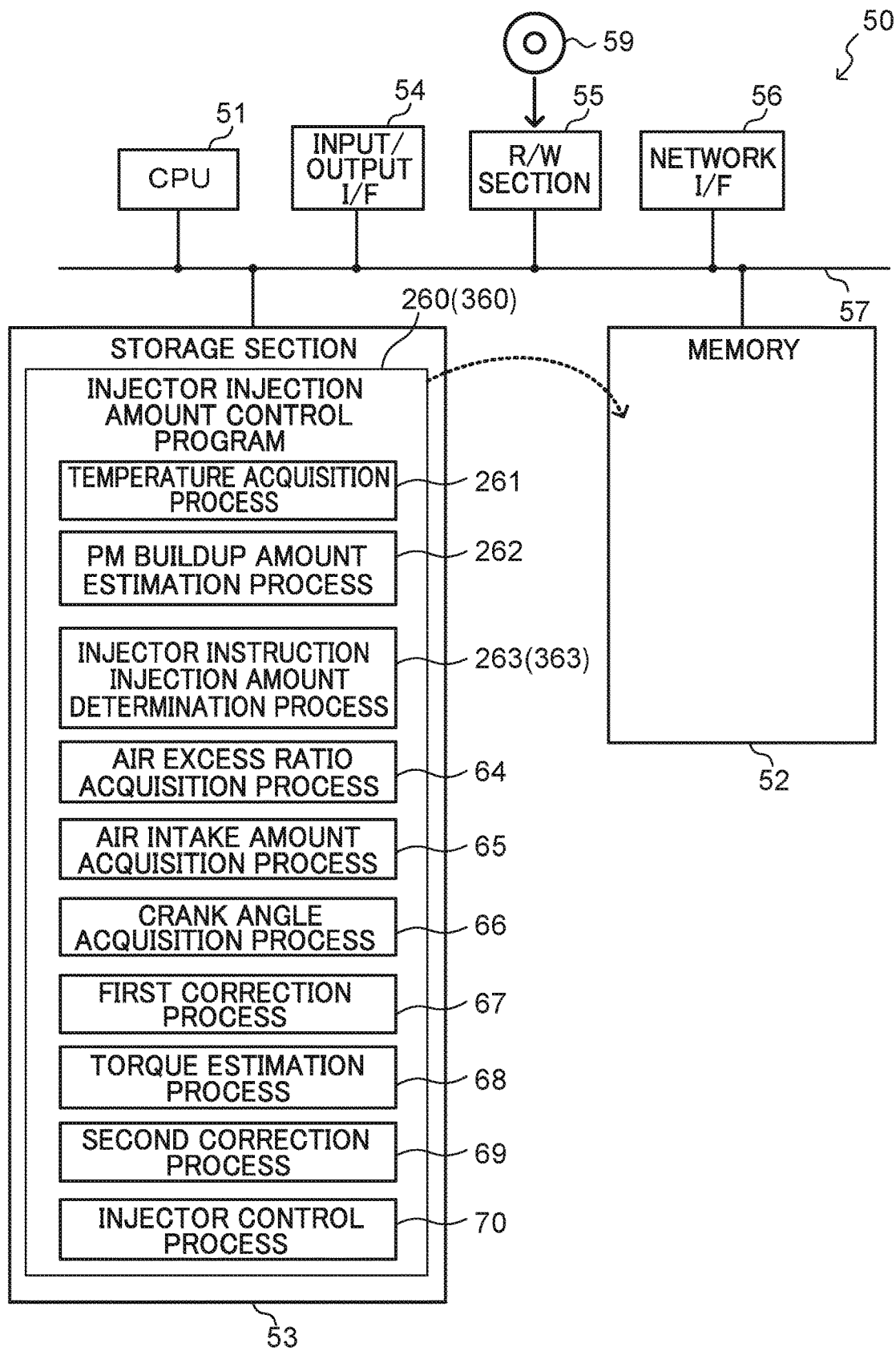
FIG. 14 is a block diagram illustrating a schematic configuration of a computer that functions as an injector injection amount control device according to a second exemplary embodiment or a third exemplary embodiment.

The injector injection amount control device 218 may, for example, be implemented by the computer 50 illustrated in FIG. 14. The computer 50 includes a CPU 51, memory 52 serving as a temporary storage region, and a non-volatile storage section 53. The computer 50 further includes an input/output I/F 54 to which input/output devices (not illustrated in the drawings) such as respective sensors, a display device, and an input device are connected, and a R/W section 55 that controls reading and writing of data to and from a recording medium 59. The computer 50 further includes a network I/F 56 connected to a network such as the internet. The CPU 51, the memory 52, the storage section 53, the input/output I/F 54, the R/W section 55, and the network I/F 56 are connected together through a bus 57.

The storage section 53 may be implemented by an HDD, an SSD, flash memory, or the like. The storage section 53, serving as a storage medium, is stored with an injector injection amount control program 260 for causing the computer 50 to function as the injector injection amount control device 218. The injector injection amount control program 260 includes a temperature acquisition process 261, a PM buildup amount estimation process 262, an injector instruction injection amount determination process 263, an air excess ratio acquisition process 64, and an air intake amount acquisition process 65. The injector injection amount control program 260 further includes a crank angle acquisition process 66, a first correction process 67, a torque estimation process 68, a second correction process 69, and an injector control process 70.

The CPU 51 reads the injector injection amount control program 260 from the storage section 53 and expands the injector injection amount control program 260 in the memory 52, and executes the processes of the injector injection amount control program 260 in sequence. The CPU 51 operates as the temperature acquisition section 219 illustrated in FIG. 11 by executing the temperature acquisition process 261. The CPU 51 operates as the PM buildup amount estimation section 223 illustrated in FIG. 11 by executing the PM buildup amount estimation process 262. The CPU 51 operates as the injector instruction injection amount determination section 220 illustrated in FIG. 11 by executing the injector instruction injection amount determination process 263. The CPU 51 operates as the air excess ratio acquisition section 22 illustrated in FIG. 11 by executing the air excess ratio acquisition process 64. The CPU 51 operates as the air intake amount acquisition section 24 illustrated in FIG. 11 by executing the air intake amount acquisition process 65. The CPU 51 operates as the crank angle acquisition section 26 illustrated in FIG. 11 by executing the crank angle acquisition process 66. The CPU 51 operates as the first correction section 28 illustrated in FIG. 11 by executing the first correction process 67. The CPU 51 operates as the torque estimation section 30 illustrated in FIG. 11 by executing the torque estimation process 68. The CPU 51 operates as the second correction section 32 illustrated in FIG. 11 by executing the second correction process 69. The CPU 51 operates as the injector control section 34 illustrated in FIG. 11 by executing the injector control process 70. The computer 50 executing the injector injection amount control program 260 thus functions as the injector injection amount control device 218. The CPU 51 corresponds to hardware that executes the injector injection amount control program 260 corresponding to software.

Note that the functionality implemented by the injector injection amount control program 260 may, for example, be implemented by a semiconductor integrated circuit, more specifically by an ASIC or the like.

As described above, the injector injection amount control device according to the second exemplary embodiment determines the instruction injection amounts for the injectors based on the buildup amount of the particulate matter PM and the temperature at the entry port of the diesel particulate filter DPF. The injector injection amount control device then corrects the injector injection amounts. This enables variation in the fuel injection amounts between the injectors to be suppressed, even during combustion-based regeneration of the diesel particulate filter DPF. This also enables a downturn in exhaust gas performance and fuel efficiency performance of the engine due to degradation of the injectors over time to be reduced.

Third Exemplary Embodiment

Explanation follows regarding a third exemplary embodiment. The third exemplary embodiment differs from the second exemplary embodiment in the point that an injector is installed inside an exhaust pipe. Note that sections having similar configurations to those in the first or second exemplary embodiments are allocated the same reference numerals, and explanation thereof is omitted.

Figure 15:
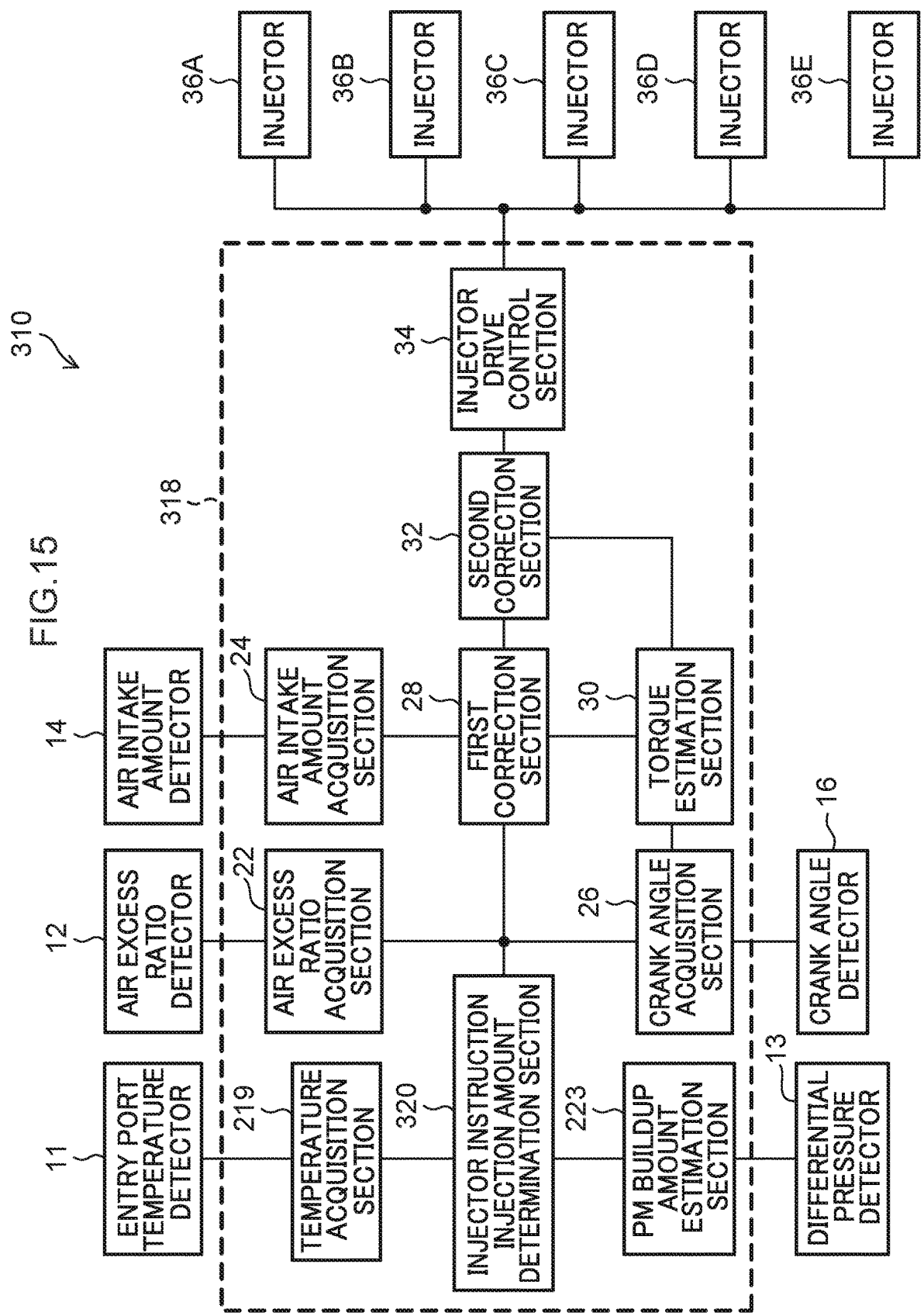
FIG. 15 is a schematic block diagram illustrating a DPF combustion-based regeneration control system according to a third exemplary embodiment.

A DPF combustion-based regeneration control system 310 illustrated in FIG. 15 includes an entry port temperature detector 11, an air excess ratio detector 12, a differential pressure detector 13, an air intake amount detector 14, a crank angle detector 16, and an injector injection amount control device 318. The DPF combustion-based regeneration control system 310 further includes plural injectors 36A, 36B, 36C, 36D, and 36E.

Figure 16:
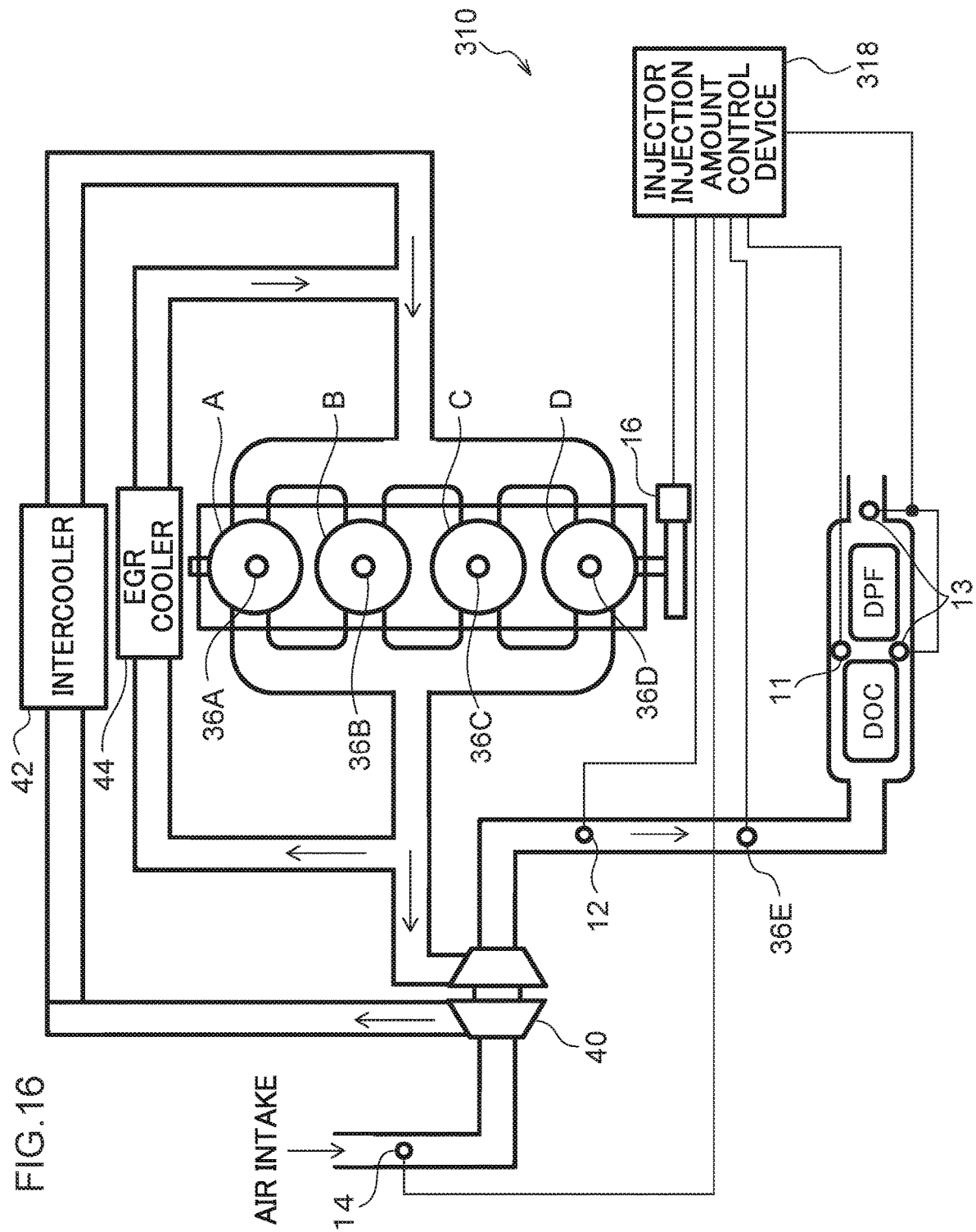
FIG. 16 is a diagram illustrating a specific example of a configuration of a DPF combustion-based regeneration control system according to the third exemplary embodiment.

FIG. 16 illustrates a specific example of a configuration of the DPF combustion-based regeneration control system 310. As illustrated in FIG. 16, in the third exemplary embodiment the injector 36E is installed inside an exhaust pipe of the engine system.

As illustrated in FIG. 15, the injector injection amount control device 318 includes an injector instruction injection amount determination section 320, an air excess ratio acquisition section 22, an air intake amount acquisition section 24, a crank angle acquisition section 26, a temperature acquisition section 219, and a PM buildup amount estimation section 223. The injector injection amount control device 318 further includes a first correction section 28, a torque estimation section 30, a second correction section 32, and an injector control section 34.

The injector instruction injection amount determination section 320 determines an instruction injection amount for the injector installed inside the exhaust pipe of the engine. The first correction section 28 and the second correction section 32 of the third exemplary embodiment correct the injector instruction injection amount, similarly to in the first exemplary embodiment.

The injector injection amount control device 318 may, for example, be implemented by the computer 50 illustrated in FIG. 14. The storage section 53 serving as a storage medium is stored with an injector injection amount control program 360 for causing the computer 50 to function as the injector injection amount control device 318.

The injector injection amount control program 360 includes a temperature acquisition process 261, a PM buildup amount estimation process 262, an injector instruction injection amount determination process 363, an air excess ratio acquisition process 64, and an air intake amount acquisition process 65. The injector injection amount control program 360 further includes a crank angle acquisition process 66, a first correction process 67, a torque estimation process 68, a second correction process 69, and an injector control process 70.

The CPU 51 reads the injector injection amount control program 360 from the storage section 53 and expands the injector injection amount control program 360 in the memory 52, and executes the processes of the injector injection amount control program 360 in sequence. The CPU 51 operates as the injector instruction injection amount determination section 320 illustrated in FIG. 15 by executing the injector instruction injection amount determination process 363.

As described above, the injector injection amount control device according to the third exemplary embodiment is capable of determining the instruction injection amount for the injector installed inside the exhaust pipe of the engine, and of correcting the instruction injection amount according to the torque of each of the cylinders.

Although explanation has been given regarding configurations in which the injector injection amount control program is pre-stored (installed) in a storage section, there is no limitation thereto. A program according to technology disclosed herein may be provided in a format recorded on a recording medium such as a CD-ROM, DVD-ROM, or USB memory.

All cited documents, patent applications, and technical standards mentioned in the present specification are incorporated by reference in the present specification to the same extent as if each individual cited document, patent application, or technical standard was specifically and individually indicated to be incorporated by reference.

Explanation follows regarding modified examples of the above exemplary embodiments.

Although explanation has been given regarding examples of cases in which the instruction injection amounts for the injectors are corrected by the second correction section 32 after the instruction injection amounts for the injectors have been corrected by the first correction section 28 in the above exemplary embodiments, there is no limitation thereto. For example, correction may be performed solely by the second correction section 32. Alternatively, configuration may be made in which the instruction injection amounts for the injectors are corrected using the first correction coefficients calculated by the first correction section 28 after the instruction injection amounts for the injectors have been corrected using the second correction coefficients calculated by the second correction section 32.

Although explanation has been given regarding examples of cases in which the indicated torque is estimated using a non-linear Kalman filter employing the crank angle and the crank angular velocity in the above exemplary embodiments, there is no limitation thereto. For example, the indicated torque may be estimated using a non-linear Kalman filter employing either one out of the crank angle or the crank angular velocity.

Although explanation has been given regarding examples of cases in which an unscented Kalman filter is employed as an example of a non-linear Kalman filter in the above exemplary embodiments, there is no limitation thereto. For example, an extended Kalman filter may be employed therefor.

In the case of related technology, for example, when a fuel pressure sensor is installed inside an injector, or when internal cylinder pressure sensors are installed inside respective cylinders, issues relating to increased cost and issues relating to maintenance arise. Moreover, when a fuel pressure sensor is installed inside an injector, or when internal cylinder pressure sensors are installed inside respective cylinders, an issue also arises in that the hardware configuration of existing engine systems is modified.

In one aspect, the disclosed technology herein has an advantageous effect of enabling variation in fuel injection amounts between the cylinders of the engine to be suppressed, without installing specific additional sensors in the engine system.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An injector injection amount control device, comprising:
    a memory; and
    a processor coupled to the memory, the processor being configured to perform a process comprising:
    acquiring a measured value of a crank angle that is a rotation angle of a crankshaft of an engine,
    determining instruction injection amounts of fuel from respective injectors, the respective injectors corresponding to a plurality of cylinders of the engine, estimating a torque arising in each of the plurality of cylinders of the engine based on a non-linear Kalman filter employing an error between the acquired measured value of the crank angle and an estimate value of the crank angle, correcting the instruction injection amounts for the respective injectors corresponding to the plurality of cylinders such that each of the plurality of estimated torques falls within the same range; and predicting the crank angle at a next timing, predicting the crank angular velocity at the next timing, and predicting the torque at the next timing according to a non-linear formula including a term relating to inertia of a piston crank mechanism of the engine, a term relating to gravity of the piston crank mechanism, a term relating to angular velocity of the piston crank mechanism, and a term relating to friction in the piston crank mechanism in the non-linear Kalman filter, which is input with a measured value of the crank angle at a current timing, a calculated value of the crank angular velocity at the current timing, and a value of the torque at the current timing.

2. The injector injection amount control device of claim 1, wherein the process further comprises:

calculating a calculated value of a crank angular velocity that is a rotational angular velocity of the crankshaft from the acquired measured value of the crank angle; and estimating the torque of each of the plurality of cylinders based on the non-linear Kalman filter, the non-linear Kalman filter employing an error between the measured value of the crank angle and the estimate value of the crank angle and an error between the calculated value of the crank angular velocity and an estimate value of the crank angular velocity.

3. The injector injection amount control device of claim 1, wherein the process further comprises further correcting the corrected instruction injection amounts for the respective injectors based on an air excess ratio of the engine, an air intake amount of the engine, and the corrected instruction injection amounts of the respective injectors.

4. The injector injection amount control device of claim 3, wherein the process further comprises:

calculating estimate values of injection amounts of fuel from the respective injectors according to a revolution speed of the engine obtained from the acquired measured value of the crank angle, the air excess ratio, and the air intake amount; and further correcting the corrected instruction injection amounts of the respective injectors such that the estimate values of the injection amounts of the respective injectors approach target injection amounts of the respective injectors.

5. The injector injection amount control device of claim 1, wherein the process further comprises predicting the crank angle at the next timing, predicting the crank angular velocity at the next timing, and predicting the torque at the next timing by employing a table expressing relationships of the crank angle to a value output by the term relating to inertia, to a value output by the term relating to gravity, to a value output by the term relating to angular velocity, and to a value output by the term relating to friction.

6. The injector injection amount control device of claim 1, wherein the process further comprises estimating a value of the torque based on a range of the crank angle corresponding to a position of a missing tooth portion of a crank rotor.

7. The injector injection amount control device of claim 1, wherein, in the process, the non-linear Kalman filter is an unscented Kalman filter.

8. The injector injection amount control device of claim 1, wherein the process further comprises:

estimating a buildup amount of particulate matter accumulated in a diesel particulate filter; and determining the instruction injection amounts of the respective injectors based on the estimated buildup amount and a temperature at an entry port of the diesel particulate filter.

9. The injector injection amount control device of claim 8, wherein the process further comprises determining the instruction injection amount of an injector, among the respective injectors, that is installed inside an exhaust pipe of the engine.

10. A non-transitory recording medium storing an injector injection amount control program that causes a computer to execute a process comprising:

acquiring a measured value of a crank angle that is a rotation angle of a crankshaft of an engine at respective timings;

determining instruction injection amounts of fuel from respective injectors, the respective injectors corresponding to a plurality of cylinders of the engine;

estimating a torque arising in each of the plurality of cylinders of the engine based on a non-linear Kalman filter employing an error between the acquired measured value of the crank angle and an estimate value of the crank angle;

correcting the instruction injection amounts for the respective injectors corresponding to the plurality of cylinders such that each of the plurality of torques falls within the same range; and predicting the crank angle at a next timing, predicting the crank angular velocity at the next timing, and predicting the torque at the next timing according to a non-linear formula including a term relating to inertia of a piston crank mechanism of the engine, a term relating to gravity of the piston crank mechanism, a term relating to angular velocity of the piston crank mechanism, and a term relating to friction in the piston crank mechanism in the non-linear Kalman filter, which is input with a measured value of the crank angle at a current timing, a calculated value of the crank angular velocity at the current timing, and a value of the torque at the current timing.

11. The non-transitory recording medium of claim 10, wherein the process further comprises:

calculating a calculated value of a crank angular velocity that is a rotational angular velocity of the crankshaft from the acquired measured value of the crank angle; and estimating the torque of each of the plurality of cylinders based on the non-linear Kalman filter, the non-linear Kalman filter employing an error between the measured value of the crank angle and the estimate value of the crank angle and an error between the calculated value of the crank angular velocity and an estimate value of the crank angular velocity.

12. The non-transitory recording medium of claim 10, wherein the process further comprises further correcting the corrected instruction injection amounts for the respective injectors based on an air excess ratio of the engine, an air intake amount of the engine, and the corrected instruction injection amounts of the respective injectors.

13. The non-transitory recording medium of claim 12, wherein the process further comprises:
- calculating estimate values of injection amounts of fuel from the respective injectors according to a revolution speed of the engine obtained from the acquired measured value of the crank angle, the air excess ratio, and the air intake amount; and
- further correcting the corrected instruction injection amounts of the respective injectors such that the estimate values of the injection amounts of the respective injectors approach target injection amounts of the respective injectors.

14. An injector injection amount control method that causes a computer to execute a process comprising:
by a processor,
- acquiring a measured value of a crank angle that is a rotation angle of a crankshaft of an engine;
- determining instruction injection amounts of fuel from respective injectors, the respective injectors corresponding to a plurality of cylinders of the engine;
- estimating a torque arising in each of the plurality of cylinders of the engine based on a non-linear Kalman filter employing an error between the acquired measured value of the crank angle and an estimate value of the crank angle;
- correcting the instruction injection amounts for the respective injectors corresponding to the plurality of cylinders such that each of the plurality of torques falls within the same range; and
- predicting the crank angle at a next timing, predicting the crank angular velocity at the next timing, and predicting the torque at the next timing according to a non-linear formula including a term relating to inertia of a piston crank mechanism of the engine, a term relating to gravity of the piston crank mechanism, a term relating to angular velocity of the piston crank mechanism, and a term relating to friction in the piston crank mechanism in the non-linear Kalman filter, which is input with a measured value of the crank angle at a current timing, a calculated value of the crank angular velocity at the current timing, and a value of the torque at the current timing.

15. The injector injection amount control method of claim 14, wherein the process further comprises:
- calculating a calculated value of a crank angular velocity that is a rotational angular velocity of the crankshaft from the acquired measured value of the crank angle; and
- estimating the torque of each of the plurality of cylinders based on the non-linear Kalman filter, the non-linear Kalman filter employing an error between the measured value of the crank angle and the estimate value of the crank angle and an error between the calculated value of the crank angular velocity and an estimate value of the crank angular velocity.

16. The injector injection amount control method of claim 14, wherein the process further comprises further correcting the corrected instruction injection amounts for the respective injectors based on an air excess ratio of the engine, an air intake amount of the engine, and the corrected instruction injection amounts of the respective injectors.

17. The injector injection amount control method of claim 16, wherein the process further comprises:
- calculating estimate values of injection amounts of fuel from the respective injectors according to a revolution speed of the engine obtained from the acquired measured value of the crank angle, the air excess ratio, and the air intake amount; and
- further correcting the corrected instruction injection amounts of the respective injectors such that the estimate values of the injection amounts of the respective injectors approach target injection amounts of the respective injectors.

* * * * *